United States Patent
Ji

(10) Patent No.: US 11,956,790 B2
(45) Date of Patent: Apr. 9, 2024

(54) METHOD OF MONITORING PDCCH, TERMINAL AND NETWORK DEVICE

(71) Applicant: VIVO MOBILE COMMUNICATION CO., LTD., Chang'an Dongguan (CN)

(72) Inventor: Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 597 days.

(21) Appl. No.: 17/152,414

(22) Filed: Jan. 19, 2021

(65) Prior Publication Data

US 2021/0144746 A1 May 13, 2021

Related U.S. Application Data

(63) Continuation of application No. PCT/CN2019/096186, filed on Jul. 16, 2019.

(30) Foreign Application Priority Data

Jul. 20, 2018 (CN) .......................... 201810805009.8

(51) Int. Cl.
*H04W 72/23* (2023.01)
*H04L 41/0803* (2022.01)
*H04W 24/06* (2009.01)

(52) U.S. Cl.
CPC .......... *H04W 72/23* (2023.01); *H04L 41/0803* (2013.01); *H04W 24/06* (2013.01)

(58) Field of Classification Search
CPC .... H04W 72/23; H04W 24/06; H04L 41/0803
USPC ....................................................... 370/259
See application file for complete search history.

(56) References Cited

U.S. PATENT DOCUMENTS

| 2009/0088148 A1 | 4/2009 | Chung et al. |
| 2014/0119253 A1 | 5/2014 | Weng et al. |
| 2014/0314042 A1 | 10/2014 | Kim et al. |
| 2015/0016371 A1 | 1/2015 | Lee et al. |

(Continued)

FOREIGN PATENT DOCUMENTS

| CN | 101809898 A | 8/2010 |
| CN | 102215586 A | 10/2011 |

(Continued)

OTHER PUBLICATIONS

International Search Report & Written Opinion related to Application No. PCT/CN2019/096186; dated Sep. 30, 2019.

(Continued)

*Primary Examiner* — Rasha S Al Aubaidi
*Assistant Examiner* — Jirapon Tulop
(74) *Attorney, Agent, or Firm* — von Briesen & Roper, s.c.

(57) ABSTRACT

A PDCCH monitoring method, a terminal and a network device are provided. The method includes: monitoring PDCCH according to PDCCH blind detection capability information of N scheduling cells which are in M cells configured for UE by a network device and further including X scheduled cells; PDCCH blind detection capability information is related to a cell parameter of M cells and indicates maximum processing capability of UE in performing PDCCH blind detection in each or N scheduling cells per unit time; M and N are positive integers greater than or equal to 1, X is a positive integer greater than or equal to 0, M=N+X.

12 Claims, 5 Drawing Sheets

(56) References Cited

U.S. PATENT DOCUMENTS

| | | |
|---|---|---|
| 2015/0036616 A1 | 2/2015 | Lee et al. |
| 2015/0271691 A1 | 9/2015 | Lee et al. |
| 2017/0013611 A1 | 1/2017 | Dinan |
| 2019/0150178 A1 | 5/2019 | Gao et al. |
| 2020/0305179 A1 | 9/2020 | Li |
| 2020/0351644 A1* | 11/2020 | Yang ............ H04W 24/02 |

FOREIGN PATENT DOCUMENTS

| | | |
|---|---|---|
| CN | 102740473 A | 10/2012 |
| CN | 104054313 A | 9/2014 |
| CN | 104145431 A | 11/2014 |
| CN | 104272614 A | 1/2015 |
| CN | 14823475 A | 8/2015 |
| CN | 104823475 A | 8/2015 |
| CN | 105682243 A | 6/2016 |
| CN | 105991263 A | 10/2016 |
| CN | 106549733 A | 3/2017 |
| CN | 107306174 | 10/2017 |
| CN | 107306174 A | 10/2017 |
| WO | 2013178043 A1 | 12/2013 |
| WO | 2018063340 A1 | 4/2018 |

OTHER PUBLICATIONS

Chinese Office Action for related Application No. 201810805009.8; dated Mar. 9, 2021,.

Huawei, Hisilicon, "Remaining issues on search space", May 21-25, 2018, 3GPP TSG RAN WG1 Meeting #93, Busan, South Korea.

Extended European Search Report for related Application No. 19838750.8; dated Jul. 29, 2021.

Vivo, "Remaining details on PDCCH space", Feb. 26-Mar. 2, 2018, 3GPP TSG RAN WG1 Meeting #92, Athens, Greece.

NTT Docomo, Inc., "Search space", Feb. 26-Mar. 2, 2018, 3GPP TSG RAN WG1 Meeting #92, Athens, Greece.

* cited by examiner

METHOD OF MONITORING PDCCH, TERMINAL AND NETWORK DEVICE

CROSS-REFERENCE TO RELATED APPLICATION

This application is a continuation application of a PCT Application No. PCT/CN2019/096186 filed on Jul. 16, 2019, which claims a priority to the Chinese patent application No. 201810805009.8 filed in China on Jul. 20, 2018 before the State of Intellectual Property Office, with a title of "a method of monitoring a PDCCH, a terminal and a network device", a disclosure of which is incorporated herein by reference in its entirety.

TECHNICAL FIELD

The present application relates to the field of communications technologies, and in particular, relates to a method of monitoring a physical downlink control channel (Physical Downlink Control Channel, PDCCH), a terminal, and a network device.

BACKGROUND

At present, 5G (NR) systems support a case where multiple control resource sets (Control Resource Set, CORESET) and multiple search space sets are configured for each component carrier (Component Carrier, CC) or cell configured for user equipment (User Equipment, UE), and the number of PDCCH candidates is configured flexibly for each search space set.

In the related art, for single-carrier scheduling or self-scheduling configuration in carrier aggregation (Carrier Aggregation, CA), the relevant protocol specifies a maximum processing capability of a UE for performing PDCCH blind detection on a CC or a cell. The maximum processing capability includes: the maximum number of PDCCH candidates on which the UE performs PDCCH blind detection, and the maximum number of channel estimates required for the UE to perform the PDCCH blind detection, that is, the number of non-overlapping control channel elements (Control Channel Element, CCE).

However, for a cross-carrier scheduling scenario, the maximum processing capability of the UE in performing PDCCH blind detection on a CC or a cell is not yet clear.

SUMMARY

An embodiment of the present invention provides a method of monitoring a PDCCH, a terminal and a network device, to solve a problem in the related art that, maximum processing capability of the UE in performing PDCCH blind detection on a CC or a cell is not defined during cross-carrier scheduling process, resulting in inability to reasonably configure corresponding blind detection behavior for the UE.

In order to address the technical problem described above, the present application is implemented as follows.

In a first aspect, an embodiment of the present invention provides a method of monitoring a PDCCH, and the method is performed by a terminal and includes: monitoring a PDCCH according to PDCCH blind detection capability information of N scheduling cells; wherein, the N scheduling cells are cells in M cells configured for the terminal by a network device, the M cells further include X scheduled cells; the PDCCH blind detection capability information of the N scheduling cells is related to a cell parameter of the M cells; the PDCCH blind detection capability information of the N scheduling cells is used to indicate maximum processing capability of the terminal in performing PDCCH blind detection in each scheduling cell or the N scheduling cells per unit time; M and N are positive integers greater than or equal to 1, X is a positive integer greater than or equal to 0, M=N+X.

In a second aspect, an embodiment of the present invention provides a method of monitoring a PDCCH, and the method is performed by a network device and includes: configuring a cell parameter of M cells for a terminal; wherein the M cells include N scheduling cells and X scheduled cells; the cell parameter is related to PDCCH blind detection capability information of the N scheduling cells; the PDCCH blind detection capability information of the N scheduling cells is used to indicate maximum processing capability of the terminal in performing PDCCH blind detection in each scheduling cell or the N scheduling cells per unit time; the cell parameter is used to indicate that the terminal monitors a PDCCH according to the PDCCH blind detection capability information of the N scheduling cells; sending a PDCCH through the N scheduling cells.

In a third aspect, an embodiment of the present invention provides a terminal, and the terminal includes a monitoring module, used to monitor a PDCCH according to PDCCH blind detection capability information of N scheduling cells; wherein, the N scheduling cells are cells of M cells configured for the terminal by a network device, the M cells further include X scheduled cells; the PDCCH blind detection capability information of the N scheduling cells is related to a cell parameter of the M cells; the PDCCH blind detection capability information of the N scheduling cells is used to indicate maximum processing capability of the terminal in performing PDCCH blind detection in each scheduling cell or the N scheduling cells per unit time; M and N are positive integers greater than or equal to 1, X is a positive integer greater than or equal to 0, M=N+X.

In a fourth aspect, an embodiment of the present invention provides a network device, and the network device includes a sending module, used to configure a cell parameter of M cells for a terminal; wherein the M cells include N scheduling cells and X scheduled cells; the cell parameter is related to PDCCH blind detection capability information of the N scheduling cells; the PDCCH blind detection capability information of the N scheduling cells is used to indicate maximum processing capability of the terminal in performing PDCCH blind detection in each scheduling cell or the N scheduling cells per unit time; the cell parameter is used to indicate that the terminal monitors a PDCCH according to the PDCCH blind detection capability information of the N scheduling cells; the sending module is further used to send a PDCCH through the N scheduling cells.

In a fifth aspect, an embodiment of the present invention provides a terminal, and the terminal includes a processor, a storage and a computer program stored on the storage and executable by the processor, wherein, in a case that the program is executed by the processor, the steps of the method of monitoring the PDCCH described in the first aspect are implemented.

In a sixth aspect, an embodiment of the present invention provides a network device, and the network device includes a processor, a storage and a computer program stored on the storage and executable by the processor, wherein, in a case that the program is executed by the processor, the steps of the method of monitoring the PDCCH described in the second aspect are implemented.

In a seventh aspect, an embodiment of the present invention provides a computer readable storage medium, wherein a computer program is stored on the computer readable storage medium. When the computer program is executed by a processor, the steps of the method of monitoring the PDCCH described above are implemented.

In an embodiment of the present invention, during cross-carrier scheduling process, a network device provided in an embodiment of the present invention configures a cell parameter of M cells including N scheduling cells and X scheduled cells for the terminal, so that a terminal may determine the maximum processing capability of the terminal in performing PDCCH blind detection in each scheduling cell or N scheduling cells (i.e., PDCCH blind detection capability information of the N scheduling cells) based on the cell parameter, which makes full use of processing capability of the terminal and improves energy efficiency of the terminal when monitoring a PDCCH.

DETAILED DESCRIPTION

The technical solutions of embodiments of the present invention will be clearly and completely described below with reference to the drawings of embodiments of the present invention. Apparently, the described embodiments are some embodiments of the present invention, but are not all the embodiments. Based on embodiments of the present invention, all other embodiments derived by a person of ordinary skill in the art without any creative efforts shall fall within the protection scope of the present application.

The technical solutions provided in the present application may be applied to various communication systems, for example, 5G communication systems, future evolution systems, or multiple communication convergence systems, and so on. A variety of application scenarios may be included, such as machine to machine (Machine to Machine, M2M), D2M, macro and micro communications, enhanced mobile broadbands (enhance Mobile Broadband, eMBB), ultra reliable & low latency communications (ultra Reliable & Low Latency Communication, uRLLC) and massive internet-of-things communications (Massive Machine Type Communication, mMTC) and other scenarios. These scenarios include, but are not limited to: communication between a terminal and a terminal, or communication between a network device and a network device, or communication between a network device and a terminal, and other scenarios. An embodiment of the present invention may be applied to communication between a network device and a terminal in a 5G communication system, or communication between a terminal and a terminal, or communication between a network device and a network device.

Figure 1:
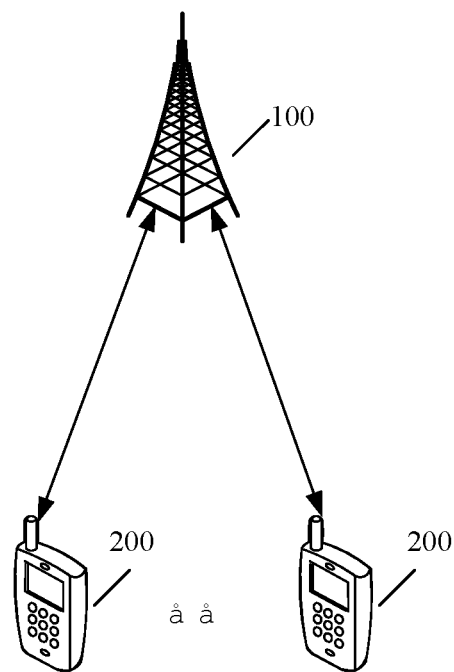
FIG. 1 is a schematic structural diagram of a communication system involved in an embodiment of the present invention.

FIG. 1 shows a possible structural schematic diagram of a communication system involved in an embodiment of the present invention. As shown in FIG. 1, the communication system includes at least one network device 100 (only one is shown in FIG. 1) and one or more terminals 200 connected to each network device 100.

The network device 100 may be a base station, a core network device, a transmission and reception point (Transmission and Reception Point, TRP), a relay station, or an access point, etc. The network device 1000 may be a base transceiver station (Base Transceiver Station, BTS) in a global system for mobile communication (Global System for Mobile communication, GSM) system or a code division multiple access (Code Division Multiple Access, CDMA) network, an NB (NodeB) in a wideband code division multiple access (Wideband Code Division Multiple Access, WCDMA) system, or an eNB or eNodeB (evolutional Node B) in a LTE system. The network device 100 may also be a radio controller in a cloud radio access network (Cloud Radio Access Network, CRAN) scenario. The network device 100 may also be a network device in a 5G communication system or a network device in a future evolution network. However, a wording does not constitute a limitation on the present application.

The terminal 200 may be a wireless terminal or a wired terminal, and the wireless terminal may be a device that provides voice and/or other service data connectivity to the user, a handheld device having a wireless communication function, a computing device or other processing device connected to a wireless modem, a vehicle-mounted device, a wearable device, a terminal in future 5G network or a terminal in a future evolved PLMN network, etc. The wireless terminal may communicate with one or more core networks via a radio access network (Radio Access Network, RAN), and the wireless terminal may be a mobile terminal, such as a mobile phone (or referred to as "cellular" phone) and a computer having a mobile terminal, for example, a portable device, a pocket device, a handheld device, a computer built-in device or an in-vehicle mobile device that exchanges language and/or data with a wireless access network, and a personal communication service (Personal Communication Service, PCS) telephone, a cordless telephone, a session initiation protocol (Session Initiation Protocol, SIP) telephone, a wireless local loop (Wireless Local Loop, WLL) station, a personal digital assistant (Personal Digital Assistant, PDA) or the like. The wireless terminal may also be a mobile device, a user equipment (UE), a UE terminal, an access terminal, a wireless communication device, a terminal unit, a terminal station, a mobile station (Mobile Station), a mobile (Mobile), a remote station (Remote Station), a remote site, a remote terminal (Remote Terminal), a subscriber unit (Subscriber Unit), a subscriber station (Subscriber Station), a user agent (User Agent), a terminal device, etc. As an example, in an embodiment of the present invention, an example of the terminal is a mobile phone shown in FIG. 1.

The following explains some terms involved in the present application to facilitate readers' understanding.

1. Cross-Carrier Scheduling

In the related art, in a case that channel quality of some cells is not good enough or a channel blocking probability is high, a network device may configure cross-carrier scheduling for a terminal, that is, a control channel is configured in other cells with better channel quality (e.g., a primary cell) to enables cross-carrier scheduling of data of other cells (e.g., a secondary cell). If a certain cell is configured with a control channel PDCCH, then the cell may be called a scheduling cell (scheduling cell). Generally, a scheduling cell may be in a self-scheduling mode, that is, the cell only schedules itself, or the cell may be in a cross-carrier scheduling mode, that is, the cell may schedule one or more scheduled cells (scheduled cell) other than itself. A scheduled cell does not have its own PDCCH, and may only be scheduled by a scheduling cell indicated by a cross-carrier scheduling configuration.

It should be noted that, subcarrier spacings (Subcarrier Spacing, SCS) of a scheduling cell and a scheduled cell may be the same or different.

A SCS configuration μ supported by the terminal is shown in Table 1 below, and each value of μ corresponds to a subcarrier spacing.

TABLE 1

| μ | $\Delta f = 2^\mu \cdot 15$ |
|---|---|
| 0 | 15 |
| 1 | 30 |
| 2 | 60 |
| 3 | 120 |
| 4 | 240 |

2. PDCCH Blind Detection Capability

The PDCCH blind detection capability refers to the maximum processing capability of a terminal in performing PDCCH blind detection in a single cell per unit time (e.g., a slot or mini-slot, etc.). The maximum processing capability includes: the maximum number of PDCCH candidates (candidate) on which the terminal performs blind detection per unit time, and the maximum number of channel estimates required for the terminal to perform blind detection, i.e., the number of non-overlapping control channel elements (Control Channel Element, CCE).

The maximum number of PDCCH candidates on which the terminal performs blind detection within a slot in a single cell under different SCS configurations is shown in Table 2 below, and each value of μ corresponds to the number of PDCCH candidates.

TABLE 2

| μ | $M_{PDCCH}^{max,slot,\mu}$ |
|---|---|
| 0 | 44 |
| 1 | 36 |
| 2 | 22 |
| 3 | 20 |

The maximum number $C_{PDCCH}^{max,slot,\mu}$ of non-overlapping CCEs on which the terminal is capable of performing blind detection in a single cell within a slot under different SCS configurations is shown in Table 3 below, and each value of μ corresponds to the number of CCEs.

TABLE 3

| μ | $C_{PDCCH}^{max,slot,\mu}$ |
|---|---|
| 0 | 56 |
| 1 | 56 |
| 2 | 48 |
| 3 | 32 |

3. Other Terms

The term "and/or" herein is only an association relationship describing associated objects, which means that there may be three kinds of relationships, for example, A and/or B can mean these three cases: A exists alone, A and B exist simultaneously, and B exists alone. In addition, the character "/" herein generally indicates that related objects before and after the character have an "or" relationship. In formulas, the character "/" indicates that associated objects before and after this character are in a "division" relationship. If not specified, the "plurality" in this article means two or more.

In order to clearly describe the technical solutions of embodiments of the present invention, in an embodiment of the present invention, terms such as "first" or "second" are used to distinguish the same or similar items that have basically the same function or effect. Those skilled in the art may understand that terms such as "first" and "second" do not limit the number and an execution order.

In an embodiment of the present invention, terms such as "exemplary" or "for example" are used to represent examples, illustrations, or explanations. In an embodiment of the present invention, any embodiment or design solution described as "exemplary" or "for example" should not be construed as being more preferable or advantageous than other embodiments or design solutions. Rather, use of terms such as "illustrative" or "for example" is intended to present concepts in a concrete manner. In an embodiment of the present invention, unless otherwise specified, meaning of "multiple" means two or more.

Embodiment 1

Figure 2:
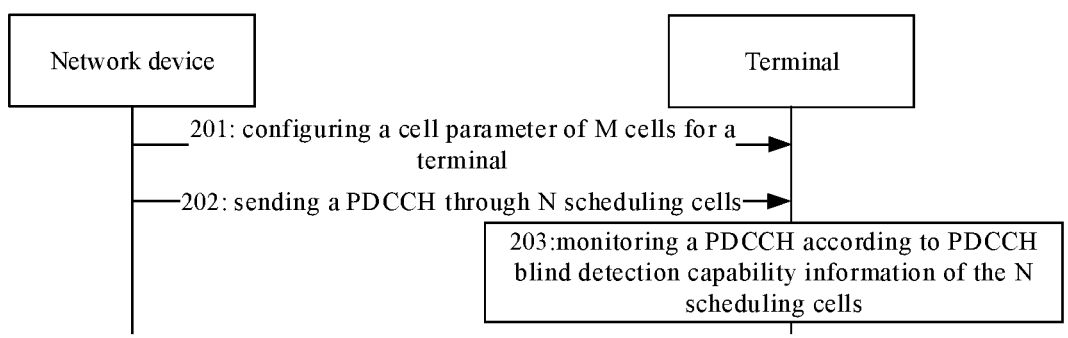
FIG. 2 is a first schematic flowchart of a method of monitoring a PDCCH provided in an embodiment of the present invention.

FIG. 2 shows a first schematic flowchart of a method of monitoring a PDCCH provided in an embodiment of the present invention. As shown in FIG. 2, the method of monitoring the PDCCH may include Step 201-Step 203.

Step 201: configuring, by a network device, a cell parameter of M cells for a terminal.

Correspondingly, a corresponding terminal receives the cell parameter sent by the network device to the terminal. The network device may be a network device in the communication system shown in FIG. 1, for example, a base station; the foregoing first terminal may be a terminal device in the communication system shown in FIG. 1.

Step 202: sending, by the network device, a PDCCH through N scheduling cells.

Step 203: monitoring, by the terminal, a PDCCH according to PDCCH blind detection capability information of the N scheduling cells.

In an embodiment of the present invention, the M cells include: N scheduling cells and X scheduled cells, some or all scheduling cells of the N scheduling cells are configured with a scheduled cell, and the X scheduled cells are scheduled cells corresponding to the some or all scheduling cells. M and N are positive integers greater than or equal to 1, X is a positive integer greater than or equal to 0, M=N+X.

It should be noted that, the scheduled cell in an embodiment of the present invention refers to a cell configured with a cross-carrier scheduling configuration.

In an embodiment of the present invention, the cell parameter is used to indicate that the terminal monitors a PDCCH according to PDCCH blind detection capability information of the N scheduling cells. The cell parameter is related to the PDCCH blind detection capability information of the N scheduling cells. The PDCCH blind detection capability information of the N scheduling cells is used to indicate the maximum processing capability of the terminal in performing PDCCH blind detection in each scheduling cell or the N scheduling cells per unit time.

In an embodiment of the present invention, the maximum processing capability includes: the maximum number of PDCCH candidates on which the terminal performs PDCCH blind detection (e.g., the number of PDCCH candidates shown in Table 2), and the maximum number of channel estimates required for the terminal to perform PDCCH blind detection, that is, the number of non-overlapping CCEs (e.g., the number of CCEs shown in Table 3).

In an embodiment of the present invention, when the terminal monitors the PDCCH, the terminal performs blind detection with a PDCCH candidate being taken as the logical unit. The terminal performs blind detection on these PDCCH candidates. If the blind detection is successful, it indicates that these PDCCH candidates are effective PDCCHs. If the blind detection is unsuccessful, it indicates that these PDCCH candidates are ineffective (for example, these PDCCH candidates are sent to other terminals, or some ineffective noise). Therefore, monitoring the PDCCH by the terminal may also be regarded as monitoring a PDCCH candidate.

Optionally, in an embodiment of the present invention, the cell parameter includes at least one of: the number of cells capable of being scheduled in each scheduling cell, a subcarrier spacing of each cell, a cell identity of each cell, and the number M of cells configured for the terminal.

In an embodiment of the present invention, the terminal may indirectly infer, according to the cell parameter, the maximum processing capability supported by the terminal in performing PDCCH blind detection, or the terminal may also directly allocate the PDCCH blind detection capability and/or a search space set and/or a PDCCH candidate to N scheduling cells or each scheduling cell according to the supported maximum processing capability reported by the terminal in performing PDCCH blind detection.

It should be noted that, in a case that the network device sends a PDCCH to the terminal through the N scheduling cells, PDCCH blind detection capability information of the N scheduling cells also needs to be determined, to ensure that the transmitted PDCCH does not exceed the maximum processing capability supported by the terminal in performing PDCCH blind detection.

In the method of monitoring the PDCCH provided in the embodiment of the present invention, during a cross-carrier scheduling process, the network device configures a cell parameter of M cells including N scheduling cells and X scheduled cells for the terminal, so that the terminal may determine the maximum processing capability of the terminal for performing PDCCH blind detection in each scheduling cell or N scheduling cells (i.e., PDCCH blind detection capability information of the N scheduling cells) based on the cell parameter, which makes full use of processing capability of the terminal and improves an energy efficiency of the terminal in monitoring a PDCCH.

Embodiment 2

Figure 3:
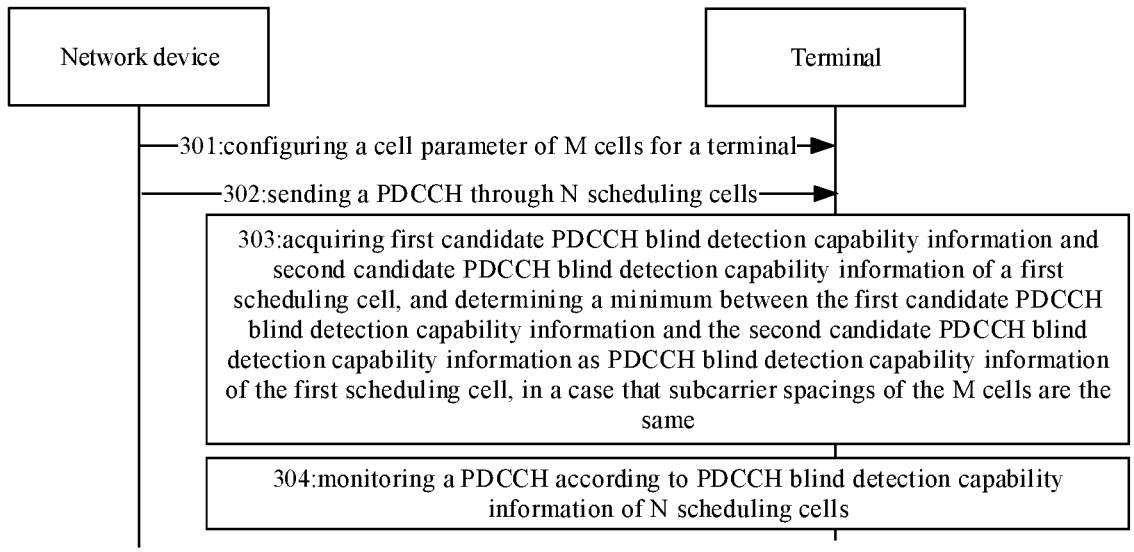
FIG. 3 is a second schematic flowchart of a method of monitoring a PDCCH provided in an embodiment of the present invention.

FIG. 3 shows a schematic flowchart of anther method of monitoring a PDCCH provided in an embodiment of the present invention. As shown in FIG. 3, an embodiment of the present invention is mainly aimed at a scenario where subcarrier spacings of M cells are the same. In this scenario, the method of monitoring the PDCCH may include Step 301-Step 304.

Step 301: configuring, by a network device, a cell parameter of M cells for a terminal.

Step 302: sending, by the network device, a PDCCH through N scheduling cells.

Step 303: acquiring, by the terminal, first candidate PDCCH blind detection capability information and second candidate PDCCH blind detection capability information of a first scheduling cell, and determining the minimum between the first candidate PDCCH blind detection capability information and the second candidate PDCCH blind detection capability information as PDCCH blind detection capability information of the first scheduling cell, in a case that subcarrier spacings of the M cells are the same.

In an embodiment of the present invention, the terminal determines PDCCH blind detection capability information of each scheduling cell based on Step 303.

In an embodiment of the present invention, the first candidate PDCCH blind detection capability information is related to at least one of: a first value, first information, and second information corresponding to a subcarrier spacing of the first scheduling cell; the second candidate PDCCH blind detection capability information is related to at least one of: the number of cells capable of being scheduled in the first scheduling cell and the second information.

The first information is used to indicate maximum processing capability supported by the terminal in performing PDCCH blind detection, i.e., the supported maximum processing capability reported by the terminal in performing PDCCH blind detection. The second information is used to indicate maximum processing capability of the terminal in performing PDCCH blind detection in a single cell under a configuration of the subcarrier spacing corresponding to the first scheduling cell, e.g., the number of PDCCH candidates in Table 2 and the number of CCEs in Table 3. The first scheduling cell is one of the N scheduling cells. The first value is an allocation ratio of PDCCH blind detection capability allocated by the terminal for the first scheduling cell.

Exemplarily, an allocation ratio of each scheduling cell may be related to the cell parameter, e.g., related to the cell number N of scheduling cells, related to a cell ID of a scheduling cell, related to a cell ID of a scheduled cell, and so on.

In an example, the first value is a ratio between the number of cells capable of being scheduled in the first scheduling cell and the number M of cells configured by the network device for the terminal.

Exemplarily, assuming that the terminal is configured with k scheduling cells, and the number of cells scheduled by each scheduling cell (including itself) is $g_k$, the maximum processing capability allocated for each scheduling cell is $\min\{R_k, S_k\}$. $R_k$ is determined according to the number of cells $T_k$ (e.g., $Rk=P\times T_k$) actually configured or activated, $S_k$ is determined according to the supported maximum processing capability Y reported by the terminal in performing PDCCH blind detection (e.g., $S_k$=floor $\{P \times Y \times f_k\}$), P is the maximum processing capability of the UE in a single cell, and $f_k$ is an allocation ratio of each scheduling cell.

Step 304: monitoring, by the terminal, a PDCCH according to PDCCH blind detection capability information of N scheduling cells.

It should be noted that, Embodiment 2 does not limit a sequence of the steps. The execution sequence of the steps should be determined based on their functions and internal logic, that is, a size of the sequence number of the steps should not constitute any limitation to an implementation process of an embodiment of the present invention. For example, Step 303 may be executed prior to Step 304, or may be executed during execution of Step 304, which is not limited in the present invention.

It should be noted that, descriptions in Embodiment 2 that are the same as or similar to those in Embodiment 1 may refer to the description in Embodiment 1, which will not be repeated in the present invention.

For example, the network device configures and activates 6 cells (i.e., Cell A, Cell B, Cell C, Cell D, Cell E and Cell F) for the terminal via an RRC, wherein Cell A is a primary cell, and Cell B, Cell C, Cell D, Cell E, and Cell F are all secondary cells, and Cell A performs cross-carrier scheduling for Cell B, Cell C and Cell D. Cell E and Cell F are self-scheduled cells.

Specifically, the network device configures a cell ID, an Index, a carrier indicator field (carrier indicator field, CIF) value, etc. of the cells. Indexes of Cell A, Cell B, Cell C, Cell D, Cell E and Cell F are 0, 1, 2, 3, 4 and 5 respectively; corresponding CIFs of Cell A, Cell B, Cell C and Cell D on Cell A are 0, 2, 3 and 1, respectively. The network device configures a PDCCH on a BWP of a scheduling cell (i.e., Cell A, Cell E, Cell F), including CORESET and an associated search space set. In addition, SCSs of BWPs of the above 6 cells are all 15 kHz.

Specifically, since the SCSs of the BWPs of the above 6 cells are all 15 kHz, it may be seen, based on the Table 2, that the maximum number of PDCCH candidates for the terminal in the above 6 cells is 44 under the configuration of the SCS being 15 kHz; based on the Table 3, it may be seen that the maximum number of non-overlapping CCEs for the terminal in the above 6 cells is 56 under the configuration of the SCS being 15 kHz. The terminal reports that a maximum CA blind detection processing capability of the terminal itself is 4.

Specifically, based on the above content, a process of determining PDCCH blind detection capability information of the scheduling cells (that is, Cell A, Cell E, and Cell F) is as follows.

1) An allocation ratio of Cell A, Cell E, and Cell F is determined.

Specifically, the number $g_1$ of schedulable cells in Cell A is equal to 4 ($g_1$=4), the number $g_2$ of schedulable cells in Cell E is equal to 1 ($g_2$=1), the number $g_3$ of schedulable cells in Cell F is equal to 1 ($g_3$=1), correspondingly, an allocation ratio of Cell A is $$f_1 = \frac{g_1}{\sum g_k} = \frac{2}{3},$$

the allocation ratio of Cell E is $$f_2 = \frac{g_2}{\sum g_k} = \frac{1}{6},$$

and the allocation ratio of Cell F is $$f_3 = \frac{g_3}{\sum g_k} = \frac{1}{6}.$$

2) PDCCH blind detection capability information of Cell A, Cell E, and Cell F is determined according to the allocation ratio of Cell A, Cell E, and Cell F.

Specifically, for Cell A, correspondingly, $$S_1 = \lfloor P \times Y \times f_1 \rfloor = \left\lfloor 44 \times 4 \times \frac{2}{3} \right\rfloor = 117$$

$$S_1 = \lfloor P \times Y \times f \rfloor = \left\lfloor 44 \times 4 \times \frac{2}{3} \right\rfloor = 117,$$

$R_1 = \lfloor P \times T_1 \rfloor = \lfloor 44 \times 4 \rfloor = 176$, the maximum number min$\{R_1, S_1\}$=117 of PDCCH candidates of Cell A is acquired.

For Cell E, correspondingly, $$S_2 = \lfloor P \times Y \times f_2 \rfloor = \left\lfloor 44 \times 4 \times \frac{1}{6} \right\rfloor = 29,$$

$R_2 = \lfloor P \times T_2 \rfloor = \lfloor 44 \times 1 \rfloor = 44$, the maximum number min$\{R_2, S_2\}$=29 of PDCCH candidates of Cell E is acquired.

For Cell F, correspondingly, $$S_3 = \lfloor P \times Y \times f_3 \rfloor = \left\lfloor 44 \times 4 \times \frac{1}{6} \right\rfloor = 29,$$

$R_3 = \lfloor P \times T_3 \rfloor = \lfloor 44 \times 1 \rfloor = 44$, the maximum number min$\{R_3, S_3\}$=29 of PDCCH candidates of Cell F is acquired.

Similarly, based on the above allocation ratios of Cell A, Cell E, and Cell F, and the fact that the maximum number of non-overlapping CCEs for the terminal in the above 6 cells is 56 under the configuration of the SCS being 15 kHz, and the maximum number of non-overlapping CCEs for Cell A, Cell E, and Cell F are respectively determined.

It should be noted that, in a case that the network device sends a PDCCH to the terminal through N scheduling cells, the network device may also determine PDCCH blind detection capability information of each scheduling cell in a manner shown in Step 303, that is, the network device may also execute the content in Step 303 on the network side. See the above for details (i.e., all contents related to Step 303), which will not be repeated here.

In the method of monitoring the PDCCH provided in the embodiment of the present invention, in a scene in which the sub-carrier spacings of M cells are the same, the network device configures a cell parameter of M cells including N scheduling cells and X scheduled cells for the terminal, so that the terminal may determine the maximum processing capability of the terminal in performing PDCCH blind detection in each scheduling cell (i.e., PDCCH blind detection capability information of each scheduling cell) based on the cell parameter, which makes full use of processing capability of the terminal and improves energy efficiency of the terminal when monitoring a PDCCH.

Embodiment 3

Figure 4:
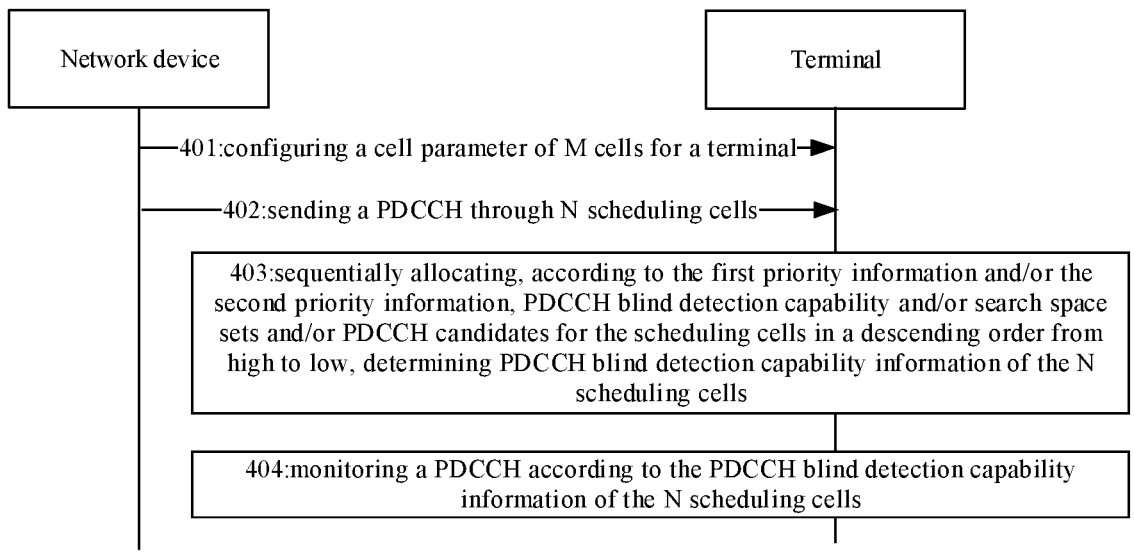
FIG. 4 is a third schematic flowchart of a method of monitoring a PDCCH provided in an embodiment of the present invention.

FIG. 4 shows a schematic flowchart of anther method of monitoring a PDCCH provided in an embodiment of the present invention. An embodiment of the present invention may be applied to any cross-carrier scheduling scenario (i.e., not only applied to a scenario where subcarrier spacings of M cells are the same, but also applied to a scenario where subcarrier spacings of M cells are different). As shown in FIG. 4, the method of monitoring the PDCCH may include Step 401-Step 404.

Step 401: configuring, by a network device, a cell parameter of M cells for a terminal.

In an embodiment of the present invention, the cell parameter further includes: first priority information of N scheduling cells and/or second priority information of the M cells.

Step 402: sending, by the network device, a PDCCH through N scheduling cells.

Step 403: sequentially allocating, by the terminal according to the first priority information and/or the second priority information, PDCCH blind detection capability and/or search space sets and/or PDCCH candidates for the scheduling cells in a descending order from high to low, determining PDCCH blind detection capability information of the N scheduling cells.

Step 404: monitoring, by the terminal, a PDCCH according to the PDCCH blind detection capability information of the N scheduling cells.

It should be noted that, an embodiment of the present invention does not limit a sequence of the steps. The execution sequence of the steps should be determined based on their functions and internal logic, that is, a size of the sequence number of the steps should not constitute any limitation to the implementation process of an embodiment of the present invention. For example, Step 403 may be executed prior to Step 404, or may be executed during execution of Step 404, which is not limited in the present invention.

It should be noted that, descriptions in Embodiment 3 that are the same as or similar to those in Embodiment 1 and/or Embodiment 2 may refer to the description in Embodiment 1 or 2, which will not be repeated in the present invention.

Exemplarily, in a case that the terminal allocates PDCCH blind detection capability for each scheduling cell, the terminal may allocate PDCCH blind detection capability based on a priority. For example, processing requirements of a cell having a high priority are firstly met, or, the maximum processing capability required by some cells is allocated preferentially (for example, a scheduling cell, a primary cell, etc.), or, the maximum processing capability required by cells is allocated based on an order of a cell ID of a scheduling cell (for example, in an ascending order from small to large), or, the maximum processing capability required for cells is allocated based on an order of the number of cells schedulable by a scheduling cell, or, the maximum processing capability required by cells is allocated based on an order of a cell ID or a CIF value of a scheduled cell (for example, in an ascending order from small to large).

For example, the network device configures and activates 6 cells (i.e., Cell A, Cell B, Cell C, Cell D, Cell E and Cell F) for the terminal via an RRC, wherein Cell A is a primary cell, and Cell B, Cell C, Cell D, Cell E, and Cell F are all secondary cells, and Cell B performs cross-carrier scheduling for Cell C, Cell D and Cell E. Cell A and Cell F are self-scheduled cells. Specifically, the network device configures a cell ID, Index, a carrier indicator field (carrier indicator field, CIF) value, etc. of the cells. Indexes of Cell A, Cell B, Cell C, Cell D, Cell E and Cell F are 0, 1, 2, 3, 4 and 5 respectively; the corresponding CIFs of Cell B, Cell C, Cell D and Cell E on Cell B are 0, 2, 3 and 1, respectively.

For example, the terminal may allocate, according to the order of the indexes (0, 4, 5) of the Cell A, Cell B, and Cell F, the maximum processing capability required by the cells; or, the terminal may allocate, according to the order of the number of cells (4, 1, 1) scheduled by Cell B, Cell A and Cell F, the maximum processing capability required by the cells; or, the terminal UE may allocate the maximum processing capability required by the cells according to the order of CIF values of the cells.

It should be noted that, in a case that the network device sends a PDCCH to the terminal through N scheduling cells, the network device may also determine PDCCH blind detection capability information of each scheduling cell in the manner shown in Step 403, that is, the network device may also execute the content in Step 403 on the network side. See the above for details (i.e., all contents related to Step 403), which will not be repeated here.

In the method of monitoring the PDCCH provided in the embodiment of the present invention, during cross-carrier scheduling process, the network device configures a cell parameter of M cells including N scheduling cells and X scheduled cells for the terminal, so that the terminal may determine, based on priority information of the cell parameter, the maximum processing capability of the terminal for performing PDCCH blind detection in each scheduling cell (i.e., PDCCH blind detection capability information of each scheduling cell) by first meeting processing requirements of a cell having a high priority, which makes full use of processing capability of the terminal and improves energy efficiency of the terminal in monitoring a PDCCH.

Embodiment 4

Figure 5:
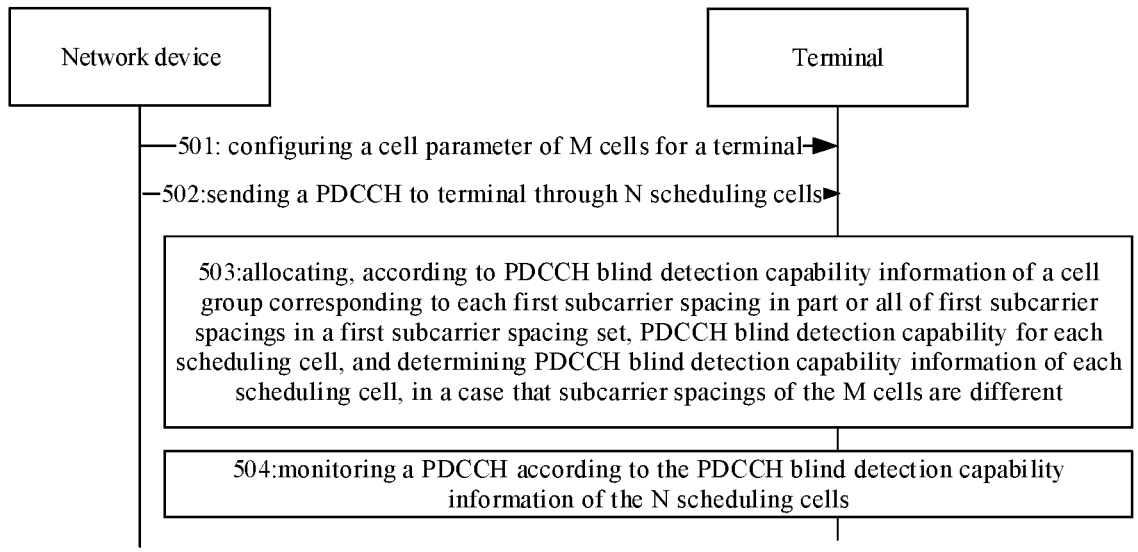
FIG. 5 is a fourth schematic flowchart of a method of monitoring a PDCCH provided in an embodiment of the present invention.

FIG. 5 shows a schematic flowchart of anther method of monitoring a PDCCH provided in an embodiment of the present invention. As shown in FIG. 5, an embodiment of the present invention is mainly aimed at a scenario where subcarrier spacings of M cells are different. In this scenario, the method of monitoring the PDCCH may include Step 501-Step 504.

Step 501: configuring, by a network device, a cell parameter of M cells for a terminal.

Step 502: sending, by the network device, a PDCCH to the terminal through N scheduling cells.

Step 503: allocating, by the terminal according to PDCCH blind detection capability information of a cell group corresponding to each first subcarrier spacing in some or all first subcarrier spacings in a first subcarrier spacing set, PDCCH blind detection capability for each scheduling cell, respectively, and determining PDCCH blind detection capability information of each scheduling cell, in a case that subcarrier spacings of the M cells are different.

In an embodiment of the present invention, the first subcarrier spacing set includes all subcarrier spacings corresponding to the N scheduling cells, or all subcarrier spacings corresponding to the M cells.

In an embodiment of the present invention, subcarrier spacings of all cells included in each cell group are the same, and first subcarrier spacings corresponding to different cell groups are different; PDCCH blind detection capability information of each cell group is related to a cell parameter of the cell group.

For example, in a case that the first subcarrier spacing set includes all subcarrier spacings corresponding to N scheduling cells, the maximum blind detection capability $$\min\left\{N\times P,\left\lceil Y\times P\times N^{\mu}\Big/\sum_{\mu=0}^{3}N^{\mu}\right\rceil\right\}$$

of a cell group corresponding to a first subcarrier spacing μ, N is the number of scheduling cells configured by a network, $N^{\mu}$ is the number of cells in the cell group corresponding to the first subcarrier spacing μ, P is the maximum processing capability of the terminal in a single cell, and Y is the maximum CA blind detection processing capability reported by the terminal itself.

Step 504: monitoring, by the terminal, a PDCCH according to the PDCCH blind detection capability information of the N scheduling cells.

In an embodiment of the present invention, PDCCH blind detection capability information of each scheduling cell may be determined through the following two implementations according to different grouping manners.

In a First Possible Implementation

In the present implementation, the terminal mainly groups the N scheduling cells according to subcarrier spacings of the N scheduling cells, and then determines PDCCH blind detection capability information of each cell group according to an allocation ratio of each cell group, and then, the PDCCH blind detection capability is allocated for each cell in the group based on the PDCCH blind detection capability information of each cell group.

Exemplarily, the method further includes the following step.

Step 503a: acquiring, by the terminal, third candidate PDCCH blind detection capability information and fourth candidate PDCCH blind detection capability information of a first cell group, and determining the minimum between the third candidate PDCCH blind detection capability information and the fourth candidate PDCCH blind detection capability information as PDCCH blind detection capability information of the first cell group, in a case that the first subcarrier spacing set includes all subcarrier spacings corresponding to the N scheduling cells.

In an embodiment of the present invention, the third candidate PDCCH blind detection capability information is related to at least one of: the number of cells capable of being scheduled in the first cell group, and third information; the fourth candidate PDCCH blind detection capability information is related to at least one of: first information, second value and the third information.

The first information is used to indicate maximum processing capability supported by the terminal in performing PDCCH blind detection; the third information is used to indicate maximum processing capability of the terminal to perform PDCCH blind detection in a single cell under a configuration of a subcarrier spacing corresponding to the first cell group, e.g., the number of PDCCH candidates shown in Table 2 and the number of CCEs shown in Table 3; the second value is an allocation ratio of PDCCH blind detection capability allocated by the terminal for the first cell group; the first cell group is one group of all cell groups.

As an example, the second value is a ratio between the number of cells capable of being scheduled by the first scheduling cell group and a sum of the number of cells capable of being scheduled by all cell groups; or, the second value may be a ratio between the number of cells in the first cell group and a sum of the number of cells in all cell groups.

For example, the network device configures and activates 7 cells (i.e., Cell A, Cell B, Cell C, Cell D, Cell E, Cell F, and Cell G) for the UE via an RRC. Cell A is a primary cell, and Cell B, Cell C, Cell D, Cell E, Cell F and Cell G are all secondary cells. Cell A performs cross-carrier scheduling to Cell B, Cell C performs cross-carrier scheduling to Cell D, and Cell E, Cell F, and Cell G are self-scheduled cells.

Specifically, the network device configures a cell ID, index, a CIF value, etc. of the cells. Indexes of Cell A, Cell B, Cell C, Cell D, Cell E, Cell F and Cell G are 0, 1, 2, 3, 4, 5 and 6, respectively. The network device configures a PDCCH on a BWP of a scheduling cell (i.e., Cell A, Cell C, Cell E, Cell F and Cell G), including CORESET and an associated search space set. A SCS of a BWP of Cell A is 15 kHz, a SCS of Cell B is 30 kHz, a SCS of Cell C is 120 kHz, a SCS of Cell D is 60 kHz, a SCS of Cell E is 15 kHz, a SCS of Cell F is 60 kHz, and a SCS of Cell G is 30 kHz. The terminal reports that the maximum CA blind detection processing capability of the terminal itself is 4.

A first implementation.

Specifically, based on the above content, a process of determining PDCCH blind detection capability information of the scheduling cells (i.e., Cell A, Cell C, Cell E, Cell F and Cell G) is as follows.

1) The terminal groups scheduling cells according to SCSs (i.e., SCSs of Cell A, Cell C, Cell E, Cell F and Cell G) of the scheduling cells.

Specifically, the number of cells of a cell group 1 (A, E) with a SCS of 15 kHz is X0=2, the number of cells of a cell group 2 (G) with a SCS of 30 kHz is X1=1, the number of cells of a cell group 3 (F) with a SCS of 60 kHz is X2=1, the number of cells of a cell group 4 (C) with a SCS of 120 kHz is X3=1.

2) An allocation ratio of each cell group is determined.

An allocation ratio of the cell group 1 with a SCS of 15 kHz is an $$f_0 = \frac{X_0}{\sum X_k} = \frac{2}{5},$$

allocation ratio of a cell group 2 with a SCS of 30 kHz is $$f_1 = \frac{X_1}{\sum X_k} = \frac{1}{5},$$

an allocation ratio of a cell group 3 with a SCS of 60 kHz is $$f_2 = \frac{X_2}{\sum X_k} = \frac{1}{5},$$

and an allocation ratio of a cell group 4 with a SCS of 120 kHz is $$f_3 = \frac{X_3}{\sum X_k} = \frac{1}{5},$$

3) PDCCH blind detection capability information of each cell group is determined according to the allocation ratio of each cell group.

Specifically, for a cell group 1 with the SCS of 15 kHz, correspondingly, $$B_0 = \lfloor P_0 \times Y \times f_0 \rfloor = \lfloor 44 \times 4 \times \frac{2}{5} \rfloor = 70,$$

$D_0 = \lfloor P_0 \times X_0 \rfloor = \lfloor 44 \times 2 \rfloor = 88$, the maximum number min{$B_0$, $D_0$}=70 of PDCCH candidates of the cell group 1 with the SCS of 15 kHz is acquired.

For the cell group 2 with the SCS of 30 kHz, correspondingly, $$B_1 = \lfloor P_1 \times Y \times f_1 \rfloor = \lfloor 36 \times 4 \times \frac{1}{5} \rfloor = 28,$$

$D_1 = \lfloor P_1 \times X_1 \rfloor = \lfloor 36 \times 1 \rfloor = 36$, the maximum number min{$B_1$, $D_1$}=28 of PDCCH candidates of the cell group 2 with the SCS of 30 kHz is acquired.

For the cell group 3 with the SCS of 60 kHz, correspondingly, $$B_2 = \lfloor P_2 \times Y \times f_2 \rfloor = \lfloor 22 \times 4 \times \frac{1}{5} \rfloor = 17,$$

$D_2 = \lfloor P_2 \times X_2 \rfloor = \lfloor 22 \times 1 \rfloor = 22$, the maximum number min{$B_2$, $D_2$}=17 of PDCCH candidates of the cell group 3 with the SCS of 60 kHz is acquired.

For the cell group 4 with the SCS of 120 kHz, correspondingly, $$B_3 = \lfloor P_3 \times Y \times f_3 \rfloor = \lfloor 20 \times 4 \times \frac{1}{5} \rfloor = 16,$$

$D_3 = \lfloor P_3 \times X_3 \rfloor = \lfloor 20 \times 1 \rfloor = 20$, the maximum number min{$B_3$, $D_3$}=16 of PDCCH candidates of the cell group 4 with the SCS of 120 kHz is acquired.

4) For a group including multiple cells (for example, the cell group 1), the maximum number of PDCCH candidates of a scheduling cell is further allocated or determined in the group, such as, it may be evenly allocated, or allocated in proportion, or allocated according to the corresponding scheme of Embodiment 2, which is not limited in the present invention.

Similarly, based on an allocation ratio of each cell group, the maximum number of non-overlapping CCEs of each cell is determined.

Second Implementation

Specifically, based on the above content, a process of determining PDCCH blind detection capability information of the scheduling cells (i.e., Cell A, Cell C, Cell E, Cell F and Cell G) is as follows.

1) The terminal groups scheduling cells according to SCSs (i.e., SCSs of Cell A, Cell C, Cell E, Cell F and Cell G) of the scheduling cells.

Specifically, the number of the cell group 1 (A, E) with a SCS of 15 kHz is X0=(2+1)=3, the number of the cell group 2 (G) with a SCS of 30 kHz is X1=1, the number of the cell group 3 (F) with a SCS of 60 kHz is X2=1, the number of the cell group 4 (C) with a SCS of 120 kHz is X3=1+1=2.

2) An allocation ratio of each cell group is determined.

An allocation ratio of the cell group 1 with a SCS of 15 kHz is $$f_0 = \frac{X_0}{\sum X_k} = \frac{3}{7},$$

an allocation ratio of the cell group 2 with a SCS of 30 kHz is $$f_1 = \frac{X_1}{\sum X_k} = \frac{1}{7},$$

an allocation ratio of the cell group 3 with a SCS of 60 kHz is $$f_2 = \frac{X_2}{\sum X_k} = \frac{1}{7},$$

and an allocation ratio of the cell group 4 with a SCS of 120 kHz is $$f_3 = \frac{X_3}{\sum X_k} = \frac{2}{7}.$$

3) PDCCH blind detection capability information of each cell group is determined according to the allocation ratio of each cell group.

Specifically, for the cell group 1 with the SCS of 15 kHz, correspondingly, $$B_0 = \lfloor P_0 \times Y \times f_0 \rfloor = \lfloor 44 \times 4 \times \frac{1}{5} \rfloor = 75,$$

$D_0 = \lfloor P_0 \times X_0 \rfloor = \lfloor 44 \times 3 \rfloor = 132$, the maximum number min{$B_0$, $D_0$}=75 of PDCCH candidates of the cell group 1 with the SCS of 15 kHz is acquired.

For the cell group 2 with the SCS of 30 kHz, correspondingly, $$B_1 = \lfloor P_1 \times Y \times f_1 \rfloor = \lfloor 36 \times 4 \times \frac{1}{5} \rfloor = 20,$$

$D_1 = \lfloor P_1 \times X_1 \rfloor = \lfloor 36 \times 1 \rfloor = 36$, the maximum number min{$B_1$, $D_1$}=20 of PDCCH candidates of the cell group 2 with the SCS of 30 kHz is acquired.

For the cell group 3 with the SCS of 60 kHz, correspondingly, $$B_2 = \lfloor P_2 \times Y \times f_2 \rfloor = \lfloor 22 \times 4 \times \frac{1}{5} \rfloor = 12,$$

$D_2 = \lfloor P_2 \times X_2 \rfloor = \lfloor 22 \times 1 \rfloor = 22$, the maximum number min{$B_2$, $D_2$}=12 of PDCCH candidates of the cell group 3 with the SCS of 60 kHz is acquired.

For the cell group 4 with the SCS of 120 kHz, correspondingly, $$B_3 = \lfloor P_3 \times Y \times f_3 \rfloor = \left\lfloor 20 \times 4 \times \frac{1}{5} \right\rfloor = 22,$$

$D_3 = P \times X_3 = 20 \times 2 = 40$, the maximum number min $\{B_3, D_3\} = 22$ of PDCCH candidates of the cell group 4 with the SCS of 120 kHz is acquired.

4) For a group including multiple cells (for example, the cell group 1), the maximum number of PDCCH candidates of a scheduling cell is further allocated or determined in the group, such as, it may be evenly allocated, or allocated in proportion, or allocated according to the corresponding scheme of Embodiment 2 or Embodiment 3, which is not limited in the present invention.

Similarly, based on an allocation ratio of each cell group, the maximum number of non-overlapping CCEs of each cell is determined.

In a Second Possible Implementation

In the present implementation, the terminal mainly groups the M cells according to subcarrier spacings of the M cells, and then allocates PDCCH blind detection capability for each cell group and then, the PDCCH blind detection capability is allocated for each cell in the group based on the PDCCH blind detection capability information of each cell group.

Exemplarily, the method further includes the following step.

Step 503b1: acquiring, by the terminal, fifth candidate PDCCH blind detection capability information of a second cell group, and determining the minimum between the fifth candidate PDCCH blind detection capability information and fourth information corresponding to the second cell group as PDCCH blind detection capability information of the second cell group, in a case that the first subcarrier spacing set includes all subcarrier spacings corresponding to the M cells.

In an embodiment of the present invention, the fifth candidate PDCCH blind detection capability information is related to at least one of: the number of cells included in the second cell group, first information, and the number M of cells configured for the terminal. The first information is used to indicate maximum processing capability supported by the terminal in performing PDCCH blind detection; the fourth information is used to indicate maximum processing capability of the terminal in performing PDCCH blind detection in a single cell under a configuration of a subcarrier spacing corresponding to the second cell group; the second cell group is one group of all cell groups.

Exemplarily, assuming that the terminal configures k scheduling cells, the number of cells schedulable by each cell (including itself) is $g_k$, $0 < J \leq g_k$, and all cells are grouped according to configured SCSs of all cells, and PDCCH blind detection capability information of each group $O^\mu$ is determined. $O^\mu$ is the maximum processing capability allowed for a single cell specified in a protocol when a SCS is $\mu$, $O^\mu = \min\{P^\mu, Q^\mu\}$, $P^\mu$ is the maximum processing capability allowed for a single cell specified in a protocol when a SCS is $\mu$, $Q^\mu$ is determined according to the supported maximum processing capability Y reported by the terminal in performing PDCCH blind detection and/or the number of cells actually configured or activated.

Optionally, in an embodiment of the present invention, in a case that the first subcarrier spacing set includes all subcarrier spacings corresponding to the M cells, Step 503 specifically includes the following substep.

Substep 503b2: allocating, by the terminal according to PDCCH blind detection capability information of a cell group where each schedulable cell corresponding to a second scheduling cell is located and a third value corresponding to each schedulable cell, PDCCH blind detection capability for the second scheduling cell, and determining PDCCH blind detection capability information of the second scheduling cell.

The third value is an allocation ratio of PDCCH blind detection capability allocated by the terminal for the schedulable cell; the second scheduling cell is one of the N scheduling cells.

Further, optionally, substep 503b2 specifically includes the following substep.

substep 503b21: determining, by the terminal according to the PDCCH blind detection capability information of the cell group where each schedulable cell corresponding to the second scheduling cell is located, a carrier spacing corresponding to each schedulable cell, a subcarrier spacing corresponding to the second scheduling cell, and a first formula, the PDCCH blind detection capability information of the second scheduling cell.

The first formula is:

$$R = \text{floor}\left(\sum_j O_{s,j}^\mu \times \frac{2^{\mu_j}}{2^{\mu_s}}\right),$$

$O_{s,j}^\mu$ is PDCCH blind detection capability information of a cell group where a j-th cell schedulable by the second scheduling cell is located, $\mu_j$ is determined according to a subcarrier spacing corresponding to the j-th schedulable cell, and $\mu_s$ is determined according to the subcarrier spacing corresponding to the second scheduling cell.

For example, the network device configures and activates 6 cells (i.e., Cell A, Cell B, Cell C, Cell D, Cell E and Cell F) for the terminal via an RRC, wherein Cell A is a primary cell, and Cell B, Cell C, Cell D, Cell E, and Cell F are all secondary cells. Cell A performs cross-carrier scheduling of Cell B, and Cell C performs cross-carrier scheduling of Cell D, and Cell E and Cell F are self-scheduled cells.

Specifically, the network device configures a cell ID, Index, a CIF value, etc. of the cells. Indexes of Cell A, Cell B, Cell C, Cell D, Cell E, and Cell F are 0, 1, 2, 3, 4, and 5, respectively. The network device configures a PDCCH on a BWP of a scheduling cell (i.e., Cell A, Cell D, Cell E and Cell F), including a CORESET and an associated search space set. A SCS of a BWP of Cell A is 15 kHz, a SCS of Cell B is 30 kHz, a SCS of Cell C is 120 kHz, a SCS of Cell D is 60 kHz, a SCS of Cell E is 15 kHz, and a SCS of Cell F is 60 kHz. The terminal reports that the maximum CA blind detection processing capability of the terminal itself is 4.

Specifically, based on the above content, a process of determining PDCCH blind detection capability information of the scheduling cells (i.e., Cell A, Cell D, Cell E and Cell F) is as follows.

1) The terminal groups the 6 cells according to SCSs of all cells.

Specifically, the number of cells of a cell group 1 (A, E) with a SCS of 15 kHz is X0=2, the number of cells of a cell group 2 (B) with a SCS of 30 kHz is X1=1, the number of cells of a cell group 3 (D, F) with a SCS of 60 kHz is X2=2, the number of cells of a cell group 4 (C) with a SCS of 120 kHz is X3=1.

2) $P^\mu$ is determined based on different SCSs: $P^0$=44 for the cell group 1, $P^1$=36 for the cell group 2, $P^2$=22 for the cell group 3, and $P^3$=20 for the cell group 4.

3) $O^\mu$ corresponding to each cell group is calculated.

Specifically, firstly, $O^\mu$ is calculated according to Y and the number T=6 of actually configured or activated cells.

For example, simply scaling in proportion: for the cell group 1, $$Q^0 = P^0 \times \frac{Y}{T} = 44 \times \frac{4}{6} = \frac{88}{3};$$

for the cell group 2, $$Q^1 = P^1 \times \frac{Y}{T} = 36 \times \frac{4}{6} = 24;$$

for the cell group 3, $$Q^2 = P^2 \times \frac{Y}{T} = 22 \times \frac{4}{6} = \frac{44}{3};$$

and for the cell group 4, $$Q^3 = P^3 \times \frac{Y}{T} = 20 \times \frac{4}{6} = \frac{40}{3}.$$

Next, $O^\mu=\min\{P^\mu,Q^\mu\}$ is calculated for each cell group respectively, $Q^0$ of the cell group 1 is $$88/3 \left(Q^0 = \frac{88}{3}\right),$$

$Q^1$ of the cell group 2 is 24 ($Q^1$=24), $Q^2$ of cell group 3 is $$44/3 \left(Q^2 = \frac{44}{3}\right),$$

and $Q^3$ of the cell group 4 is $$40/3 \left(Q^3 = \frac{40}{3}\right).$$

4) PDCCH blind detection capability information of each scheduling cell is determined according to $O^\mu$ corresponding to each cell group.

For a scheduling Cell A, a subcarrier spacing corresponding to the scheduling Cell A is 15 kHz, correspondingly μ=0, and a subcarrier spacing corresponding to the scheduled Cell B corresponding to the scheduling Cell A is 30 kHz, correspondingly μ=1.

$$f_A^0 = \frac{2^{\mu_0}}{2^{\mu_A}} = 1, f_A^1 = \frac{2^{\mu_1}}{2^{\mu_A}} = 2, f_A^2 = \frac{2^{\mu_2}}{2^{\mu_A}} = 4, f_A^3 = \frac{2^{\mu_3}}{2^{\mu_A}} = 8;$$

The maximum number of PDCCH candidates allocated by the terminal for the scheduling Cell A is:

$$\text{floor}\left\{\sum_j O_{S,j}^\mu \times \frac{2^{\mu_j}}{2^{\mu_S}}\right\}, \text{floor}\left\{\sum_j O_{A,j}^\mu \times f_A^j\right\} =$$

$$\text{floor}\left\{\sum_j O_{A,j}^0 \times f_A^0 + O_{A,j}^1 \times f_A^1\right\} = \text{floor}\left\{\frac{88}{3} \times 1 + 24 \times 2\right\} = 77.$$

For a scheduling Cell C, a subcarrier spacing corresponding to the scheduling Cell C is 120 kHz, correspondingly μ=3, and a subcarrier spacing corresponding to the scheduled Cell D corresponding to the scheduling Cell C is 60 kHz, correspondingly μ=2.

$$f_C^0 = \frac{2^{\mu_0}}{2^{\mu_C}} = \frac{1}{8}, f_C^1 = \frac{2^{\mu_1}}{2^{\mu_C}} = \frac{1}{4}, f_C^2 = \frac{2^{\mu_2}}{2^{\mu_C}} = \frac{1}{2}, f_C^3 = \frac{2^{\mu_3}}{2^{\mu_C}} = 1.$$

The maximum number of PDCCH candidates allocated by the terminal for a scheduling Cell C is:

$$\text{floor}\left\{\sum_j O_{C,j}^\mu \times f_C^j\right\} =$$

$$\text{floor}\{O_{C,j}^2 \times f_C^2 + O_{C,j}^3 \times f_C^3\} = \text{floor}\left\{\frac{44}{3} \times \frac{1}{2} + \frac{40}{3} \times 1\right\} = 20.$$

Similarly, the maximum number of PDCCH candidates for a scheduling Cell E is:

$$\text{floor}\left\{\sum_j O_{E,j}^\mu \times f_E^j\right\} = 29.$$

Similarly, the maximum number of PDCCH candidates for a scheduling Cell F is:

$$\text{floor}\left\{\sum_j O_{F,j}^\mu \times f_F^j\right\} = 14.$$

Similarly, the maximum number of non-overlapping CCEs of each scheduling cell is acquired.

It should be noted that, Embodiment 4 does not limit a sequence of the steps. The execution sequence of the steps should be determined based on their functions and internal logic, that is, a size of the sequence number of the steps should not constitute any limitation to the implementation process of Embodiment 4. For example, Step 502 may be executed prior to Step 503, or may be executed during execution of Step 503, which is not limited in the present invention.

It should be noted that, descriptions in Embodiment 4 that are the same as or similar to those in Embodiment 1 to Embodiment 3 may refer to the description in Embodiment 1 to 3, which will not be repeated in the present invention.

It should be noted that, in a case that the network device sends a PDCCH to the terminal through N scheduling cells, the network device may also determine PDCCH blind detection capability information of each scheduling cell in the manner shown in Step 503, that is, the network device may also execute the content in Step 503 on the network side. See the above for details (i.e., all contents related to Step 503), which will not be repeated here.

In the method of monitoring the PDCCH provided in the embodiment of the present invention, in a scenario where subcarrier spacings of the M cells are different, by grouping the cells, the terminal determines the maximum processing capability of the terminal to perform PDCCH blind detection in each cell group (that is, PDCCH blind detection capability information of each cell group), and further performs capability allocation within the group, and determines the maximum processing capability of the terminal in performing PDCCH blind detection in each scheduling cell in the cell group, which makes full use of processing capability of the terminal and improves energy efficiency of the terminal when monitoring a PDCCH.

Embodiment 5

Figure 6:
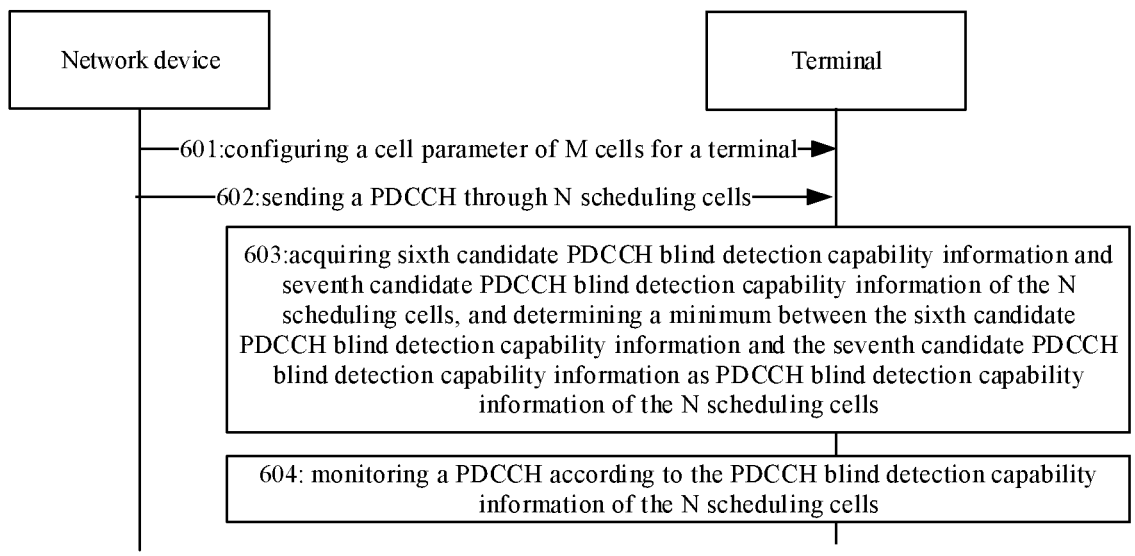
FIG. 6 is a fifth schematic flowchart of a method of monitoring a PDCCH provided in an embodiment of the present invention.

FIG. 6 shows a schematic flowchart of anther method of monitoring a PDCCH provided in an embodiment of the present invention. An embodiment of the present invention are mainly aimed at a scenario where PDCCH blind detection capability information of N scheduling cells is used to indicate the maximum processing capability of the terminal in performing PDCCH blind detection in the N scheduling cells per unit time. As shown in FIG. 6, the method of monitoring the PDCCH may include Step 601-Step 604.

Step 601: configuring, by a network device, a cell parameter of M cells for a terminal.

Step 602: sending, by the network device, a PDCCH through N scheduling cells.

Step 603: acquiring, by the terminal, sixth candidate PDCCH blind detection capability information and seventh candidate PDCCH blind detection capability information of the N scheduling cells, and determining the minimum between the sixth candidate PDCCH blind detection capability information and the seventh candidate PDCCH blind detection capability information as PDCCH blind detection capability information of the N scheduling cells.

In an embodiment of the present invention, the sixth candidate PDCCH blind detection capability information is related to at least one of: first information, and second information corresponding to a subcarrier spacing of each scheduling cell and/or each scheduled cell; the seventh candidate PDCCH blind detection capability information is related to at least one of: the number M of cells configured for the terminal and the second information.

The first information is used to indicate maximum processing capability supported by the terminal in performing PDCCH blind detection; the second information is used to indicate maximum processing capability of the terminal in performing PDCCH blind detection in a single cell under a configuration of the subcarrier spacing corresponding to the scheduling cell and/or the scheduled cell.

Step 604: monitoring, by the terminal, a PDCCH according to the PDCCH blind detection capability information of the N scheduling cells.

It should be noted that, Embodiment 5 does not limit a sequence of the steps. The execution sequence of the steps should be determined based on their functions and internal logic, that is, a value of the sequence number of the steps should not constitute any limitation to an implementation process of Embodiment 5. For example, Step 603 may be executed prior to Step 604, or may be executed during execution of Step 604, which is not limited in the present invention.

It should be noted that, descriptions in Embodiment 5 that are the same as or similar to those in Embodiment 1 to Embodiment 4 may refer to the description in Embodiment 1 to 4, which will not be repeated in the present invention.

It should be noted that, an embodiment of the present invention may be applied to any cross-carrier scheduling scenario (i.e., not only applied to a scenario where subcarrier spacings of M cells are the same, but also applied to a scenario where subcarrier spacings of M cells are different).

It should be noted that, in a case that the network device sends a PDCCH to the terminal through N scheduling cells, the network device may also determine PDCCH blind detection capability information of N scheduling cells in the manner shown in Step 603, that is, the network device may also execute the content in Step 603 on the network side. See the above for details (i.e., all contents related to Step 603), which will not be repeated here.

In the method of monitoring the PDCCH provided in the embodiment of the present invention, during a cross-carrier scheduling process, the network device configures a cell parameter of M cells including N scheduling cells and X scheduled cells for the terminal, so that the terminal may determine the maximum processing capability of the terminal for performing PDCCH blind detection in N scheduling cells (i.e., entire PDCCH blind detection capability information of the N scheduling cells) based on the cell parameter, which makes full use of processing capability of the terminal and improves energy efficiency of the terminal in monitoring a PDCCH.

Embodiment 6

Figure 7:
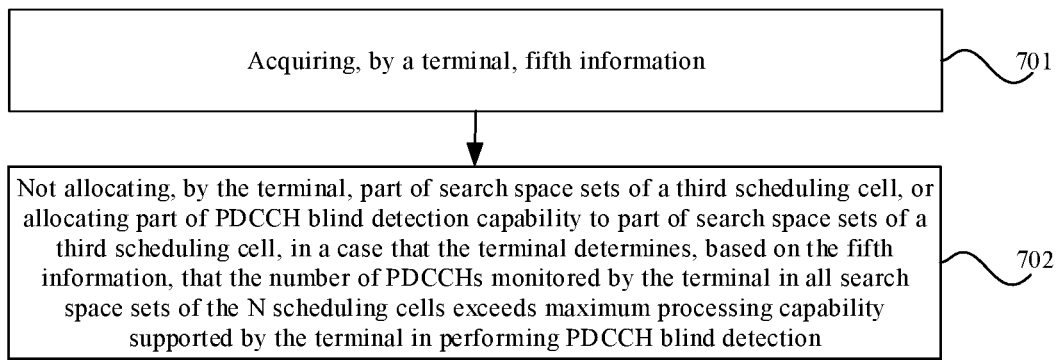
FIG. 7 is a sixth schematic flowchart of a method of monitoring a PDCCH provided in an embodiment of the present invention.

FIG. 7 shows a schematic flowchart of another method of monitoring a PDCCH provided in an embodiment of the present invention. As shown in FIG. 7, the method of monitoring the PDCCH may include Step 701-Step 702.

Step 701: acquiring, by a terminal, fifth information.

The fifth information is used to indicate the number of PDCCHs monitored by the terminal in all search space sets of the N scheduling cells;

Optionally, in an embodiment of the present invention, the method further includes the following step.

Step 701*a*: receiving, by the terminal, configuration information sent by a network device.

The fifth information is related to the configuration information, that is, the terminal may determine the fifth information based on the configuration information. The configuration information includes at least one of: time-frequency domain resource information of PDCCH blind detection corresponding to each scheduling cell, a search space set associated with each scheduling cell, and fourth information corresponding to each search space set; wherein, the fourth information is used to indicate the number of PDCCHs monitored by the terminal in the search space set.

Step 702: not allocating, by the terminal, some search space sets of a third scheduling cell, or allocating part of PDCCH blind detection capability to some search space sets of a third scheduling cell, in a case that the terminal determines, based on the fifth information, that the number of PDCCHs monitored by the terminal in all search space sets of the N scheduling cells exceeds maximum processing capability supported by the terminal in performing PDCCH blind detection.

The third scheduling cell is one of the N scheduling cells, and the third scheduling cell corresponds to at least one scheduled cell.

In an embodiment of the present invention, in a case that the scheduling cell is configured to perform cross-carrier scheduling to other cells (that is, a scheduling cell corresponds to at least one scheduled cell), the scheduling cell may be overbooked (overbooking), that is, processing capability to a search space set allowed to be configured exceeds the maximum processing capability supported by the terminal in performing PDCCH blind detection. A secondary cell that is not configured with cross-carrier scheduling is not allowed to be overbooked, that is, processing capability to the configured search space set may not exceed the maximum processing capability.

Exemplarily, in a case that the terminal actually allocates a search space set, the search space set is ranked based on at least one of the following information (e.g., an ID of a search space set, a period, the number of PDCCH candidates, the number of symbols, a format of a monitored DCI, etc.) corresponding to each search space set. A search space set is allocated in a ranked order or is discarded. Allocation is stopped and all remaining search space sets are discarded in a case that the required processing capability exceeds the maximum processing capability.

Exemplarily, for a PDCCH candidate, the terminal may rank each PDCCH candidate according to at least one of the following information (e.g., a CIF value, an aggregation level, a cell ID or an index, CCE coordinates, etc.) corresponding to the PDCCH candidate, and PDCCH candidates are allocated or discarded in a rank order.

For example, the network device configures and activates 6 cells (i.e., Cell A, Cell B, Cell C, Cell D, Cell E and Cell F) for the terminal via an RRC, wherein Cell A is a primary cell, and Cell B, Cell C, Cell D, Cell E, and Cell F are all secondary cells, and Cell B performs cross-carrier scheduling to Cell C, Cell D and Cell E. Cell A and Cell F are self-scheduled cells.

Specifically, the network device configures a cell ID, Index, a CIF value, etc. of the cells. Indexes of Cell A, Cell B, Cell C, Cell D, Cell E, and Cell F are 0, 1, 2, 3, 4, and 5, respectively. Corresponding CIFs of Cell B, Cell C, Cell D and Cell E on Cell B are 0, 2, 3 and 1, respectively. SCSs of BWPs of all cells are 15 kHz. The terminal reports that the maximum CA blind detection processing capability of the terminal itself is 4.

Specifically, the network device configures a PDCCH on a BWP of Cell A, Cell B and Cell F (i.e., a scheduling cell), including CORESET and an associated search space set, and performs overbooking on the number of PDCCH candidates of Cell B. The number of PDCCH candidates of CSS in Cell A is 7, and the number of PDCCH candidates of USS is 32; the number of PDCCH candidates of USS1, USS2, USS3 and USS4 in Cell B are all 32; the number of PDCCH candidates of USS in Cell F is 32.

The terminal may dynamically share the maximum number of PDCCH candidates among multiple scheduling cells. Therefore, the number of PDCCH candidates (7+32*6=199) in all search space sets of all scheduling cells of the terminal may be calculated based on the above content, i.e., processing requirements for all scheduling cells of the terminal. Since the maximum number of PDCCH candidates (44*4=176) supported by the terminal is less than 199, the network device may select a scheduling cell that only schedules itself, to limit processing capability of the scheduling cell itself, that is, processing capability of a search space set configured for the cell may not exceed the maximum processing capability of the cell. For example, since the network side performs overbooking on Cell B, the terminal may choose to discard some PDCCH candidates of Cell B, for example, USS4 on Cell B does not be allocated, so as to ensure the maximum number (7+32*5=167) of PDCCH candidates required by all scheduled cells of the terminal is less than the maximum number (44*4=176) of PDCCH candidates supported by the terminal.

Similarly, allocation of the maximum number of non-overlapping CCEs may be determined.

It should be noted that, the network device may also execute, on the network side, the contents in Step 701 and Step 702 above, which will not be repeated here.

In the method of monitoring the PDCCH provided in the embodiment of the present invention, in a scenario where a processing demand for N scheduling cells is greater than the maximum processing capability supported by the terminal, it is ensured, by limiting processing capability to a scheduling cell that only schedules itself, that the maximum processing capability allocated by the terminal to the N scheduling cells does not exceed the maximum processing capability supported by the terminal.

Embodiment 7

Figure 8:
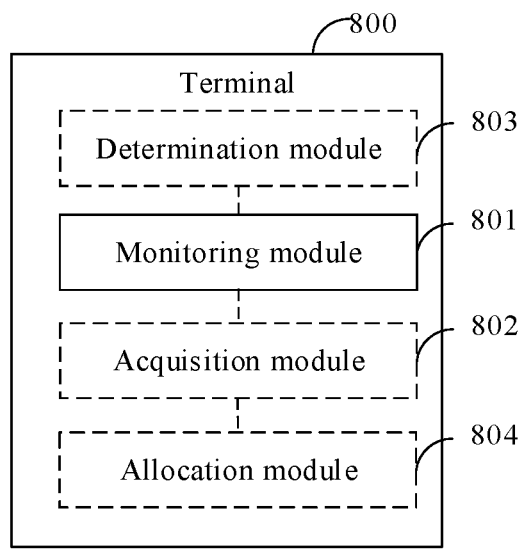
FIG. 8 is a first schematic structural diagram of a terminal provided in an embodiment of the present invention.

As shown in FIG. 8, an embodiment of the present invention provides a terminal 800, the terminal 800 includes: a monitoring module 801.

The monitoring module 801 is used to monitor a PDCCH according to PDCCH blind detection capability information of N scheduling cells.

The N scheduling cells are cells from M cells configured for the terminal by a network device, the M cells further include: X scheduled cells; the PDCCH blind detection capability information of the N scheduling cells is related to a cell parameter of the M cells; the PDCCH blind detection capability information of the N scheduling cells is used to indicate maximum processing capability of the terminal in performing PDCCH blind detection in each scheduling cell or the N scheduling cells per unit time; M and N are positive integers greater than or equal to 1, X is a positive integer greater than or equal to 0, M=N+X.

Optionally, the cell parameter includes at least one of: the number of cells capable of being scheduled in each scheduling cell, a subcarrier spacing of each cell, a cell identity of each cell, and the number M of cells configured for the terminal.

Optionally, as shown in FIG. 8, the terminal 800 further includes: an acquisition module 802.

The acquisition module 802 is used to acquire first candidate PDCCH blind detection capability information and second candidate PDCCH blind detection capability information of a first scheduling cell, and determine the minimum between the first candidate PDCCH blind detection capability information and the second candidate PDCCH blind detection capability information as PDCCH blind detection capability information of the first scheduling cell, in a case that subcarrier spacings of the M cells are the same.

The first candidate PDCCH blind detection capability information is related to at least one of: a first value, first information, and second information corresponding to a subcarrier spacing of the first scheduling cell; the second candidate PDCCH blind detection capability information is related to at least one of: the number of cells capable of being scheduled by the first scheduling cell and second information; the first information is used to indicate maximum processing capability supported by the terminal in performing PDCCH blind detection; the second information is used to indicate maximum processing capability of the terminal in performing PDCCH blind detection in a single cell under a configuration of the subcarrier spacing corresponding to the first scheduling cell; the first value is an allocation ratio of PDCCH blind detection capability allocated by the terminal for the first scheduling cell; the first scheduling cell is one of the N scheduling cells.

Optionally, the first value is a ratio between the number of cells capable of being scheduled by the first scheduling cell and the number M of cells configured for the terminal.

The cell parameter includes: first priority information of the N scheduling cells and/or second priority information of the M cells. As shown in FIG. 8, the terminal 800 further includes a determination module 803.

The determination module 803 is used to sequentially allocate, according to the first priority information and/or the second priority information, PDCCH blind detection capability and/or a search space set and/or a PDCCH candidate for each scheduling cell in a descending order from high to low, determine the PDCCH blind detection capability information of the N scheduling cells.

Optionally, the acquisition module 802 is used to allocate, according to PDCCH blind detection capability information of a cell group corresponding to each first subcarrier spacing in some or all first subcarrier spacings in a first subcarrier spacing set, PDCCH blind detection capability for each scheduling cell in each cell group, respectively, and determine PDCCH blind detection capability information of each scheduling cell in each cell group, in a case that subcarrier spacings of the M cells are different.

The first subcarrier spacing set includes all subcarrier spacings corresponding to the N scheduling cells, or all subcarrier spacings corresponding to the M cells; subcarrier spacings of all cells included in each cell group are the same, and first subcarrier spacings corresponding to different cell groups are different; PDCCH blind detection capability information of each cell group is related to a cell parameter of the cell group.

Optionally, the acquisition module 802 is further used to acquire third candidate PDCCH blind detection capability information and fourth candidate PDCCH blind detection capability information of a first cell group, and determine the minimum between the third candidate PDCCH blind detection capability information and the fourth candidate PDCCH blind detection capability information as PDCCH blind detection capability information of the first cell group, in a case that the first subcarrier spacing set includes all subcarrier spacings corresponding to the N scheduling cells.

The third candidate PDCCH blind detection capability information is related to at least one of: the number of cells capable of being scheduled by the first cell group, and third information; the fourth candidate PDCCH blind detection capability information is related to at least one of: first information, second value and the third information; the first information is used to indicate maximum processing capability supported by the terminal in performing PDCCH blind detection; the third information is used to indicate maximum processing capability of the terminal in performing PDCCH blind detection in a single cell under a configuration of the subcarrier spacing corresponding to the first cell group; the second value is an allocation ratio of PDCCH blind detection capability allocated by the terminal for the first cell group; the first cell group is one group of all cell groups.

Optionally, the second value is a ratio between the number of cells capable of being scheduled by the first scheduling cell and a sum of the number of cells capable of being scheduled by all cell groups; or, the second value is a ratio between the number of cells in the first cell group and a sum of the number of cells in all cell groups.

Optionally, the acquisition module 802 is further used to acquire fifth candidate PDCCH blind detection capability information of a second cell group, and determine the minimum between the fifth candidate PDCCH blind detection capability information and fourth information corresponding to the second cell group as PDCCH blind detection capability information of the second cell group, in a case that the first subcarrier spacing set includes all subcarrier spacings corresponding to the M cells.

The fifth candidate PDCCH blind detection capability information is related to at least one of: the number of cells included in the second cell group, first information, and the number M of cells configured for the terminal. The first information is used to indicate maximum processing capability supported by the terminal in performing PDCCH blind detection; the fourth information is used to indicate maximum processing capability of the terminal in performing PDCCH blind detection in a single cell under a configuration of a subcarrier spacing corresponding to the second cell group; the second cell group is one group of all cell groups.

Optionally, in a case that the first subcarrier spacing set includes all subcarrier spacings corresponding to the M cells, the determination module 803 is specifically used to: allocate, according to PDCCH blind detection capability information of a cell group where each schedulable cell corresponding to a second scheduling cell is located and a third value corresponding to each schedulable cell, PDCCH blind detection capability for the second scheduling cell, and determine PDCCH blind detection capability information of the second scheduling cell; wherein the third value is an allocation ratio of PDCCH blind detection capability allocated by the terminal for the schedulable cell; the second scheduling cell is one of the N scheduling cells.

Optionally, the determination module 803 is further used to: determine the PDCCH blind detection capability information of the second scheduling cell according to the PDCCH blind detection capability information of the cell group where each schedulable cell corresponding to the second scheduling cell is located, a carrier spacing corresponding to each schedulable cell, a subcarrier spacing corresponding to the second scheduling cell, and a first formula.

The first formula is:

$$R = \text{floor}\left\{\sum_j O_{s,j}^\mu \times \frac{2^{\mu_j}}{2^{\mu_s}}\right\},$$

$O_{s,j}^\mu$ is PDCCH blind detection capability information of a cell group where a j-th cell schedulable by the second scheduling cell is located, $\mu_j$ is determined according to a subcarrier spacing corresponding to the j-th schedulable cell, and $\mu_s$ is determined according to the subcarrier spacing corresponding to the second scheduling cell.

Optionally, the acquisition module 802 is further used to, acquire sixth candidate PDCCH blind detection capability information and seventh candidate PDCCH blind detection capability information of the N scheduling cells, and determine the minimum between the sixth candidate PDCCH blind detection capability information and the seventh candidate PDCCH blind detection capability information as PDCCH blind detection capability information of the N scheduling cells.

The sixth candidate PDCCH blind detection capability information is related to at least one of: first information, and second information corresponding to a subcarrier spacing of each scheduling cell and/or each scheduled cell; the seventh candidate PDCCH blind detection capability information is related to at least one of: the number M of cells configured for the terminal and the second information; the first information is used to indicate maximum processing capability supported by the terminal in performing PDCCH blind detection; the second information is used to indicate maximum processing capability of the terminal in performing PDCCH blind detection in a single cell under a configuration of the subcarrier spacing corresponding to the scheduling cell and/or the scheduled cell.

Optionally, as shown in FIG. 8, the terminal 800 further includes: an allocation module 804.

The acquisition module 802 is further used to acquire fifth information; wherein, the fifth information is used to indicate the number of PDCCHs monitored by the terminal in all search space sets of the N scheduling cells; the allocation module 804 is used to not allocate some search space sets of a third scheduling cell, or allocate part of PDCCH blind detection capability to some search space sets of a third scheduling cell, in a case that it is determined based on the fifth information acquired by the acquisition module 802 that the number of PDCCHs monitored by the terminal in all search space sets of the N scheduling cells exceeds maximum processing capability supported by the terminal in performing PDCCH blind detection.

The third scheduling cell is one of the N scheduling cells, and the third scheduling cell corresponds to at least one scheduled cell.

The terminal provided in the embodiment of the present invention may implement the process shown in any one of FIG. 2 to FIG. 7 in the method embodiments. Details are not described herein again to avoid repetition.

For the terminal provided in the embodiment of the present invention, during cross-carrier scheduling process, the network device configures a cell parameter of M cells including N scheduling cells and X scheduled cells for the terminal, the terminal determines the maximum processing capability of the terminal for performing PDCCH blind detection in each scheduling cell or N scheduling cells (i.e., PDCCH blind detection capability information of the N scheduling cells) based on the cell parameter, which makes full use of processing capability of the terminal and improves energy efficiency of the terminal when monitoring a PDCCH.

Embodiment 8

Figure 9:
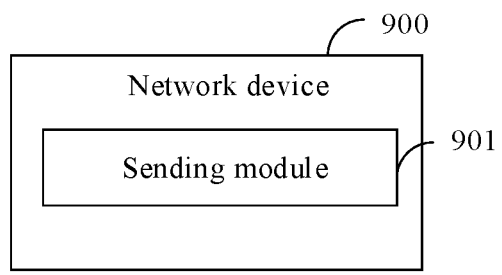
FIG. 9 is a first schematic structural diagram of a network device provided in an embodiment of the present invention.

FIG. 9 is a schematic structural diagram of a network device that implements an embodiment of the present invention. As shown in FIG. 9, a network device 900 includes: a sending module 901.

The sending module 901 is used to configure a cell parameter of M cells for a terminal; wherein the M cells include: N scheduling cells and X scheduled cells; the cell parameter is related to PDCCH blind detection capability information of the N scheduling cells; the PDCCH blind detection capability information of the N scheduling cells is used to indicate maximum processing capability of the terminal in performing PDCCH blind detection in each scheduling cell or the N scheduling cells per unit time; the cell parameter is used to indicate that the terminal monitors a PDCCH according to the PDCCH blind detection capability information of the N scheduling cells.

The sending module 901 is further used to send a PDCCH through the N scheduling cells.

The terminal provided in the embodiment of the present invention may implement the process shown in any one of FIG. 2 to FIG. 7 in the method embodiments. Details are not described herein again to avoid repetition.

During cross-carrier scheduling process, the network device provided in the embodiment of the present invention configures a cell parameter of M cells including N scheduling cells and X scheduled cells for the terminal, so that the terminal may determine the maximum processing capability of the terminal in performing PDCCH blind detection in each scheduling cell or N scheduling cells (i.e., PDCCH blind detection capability information of the N scheduling cells) based on the cell parameter, which makes full use of processing capability of the terminal and improves energy efficiency of the terminal when monitoring a PDCCH.

Embodiment 9

Figure 10:
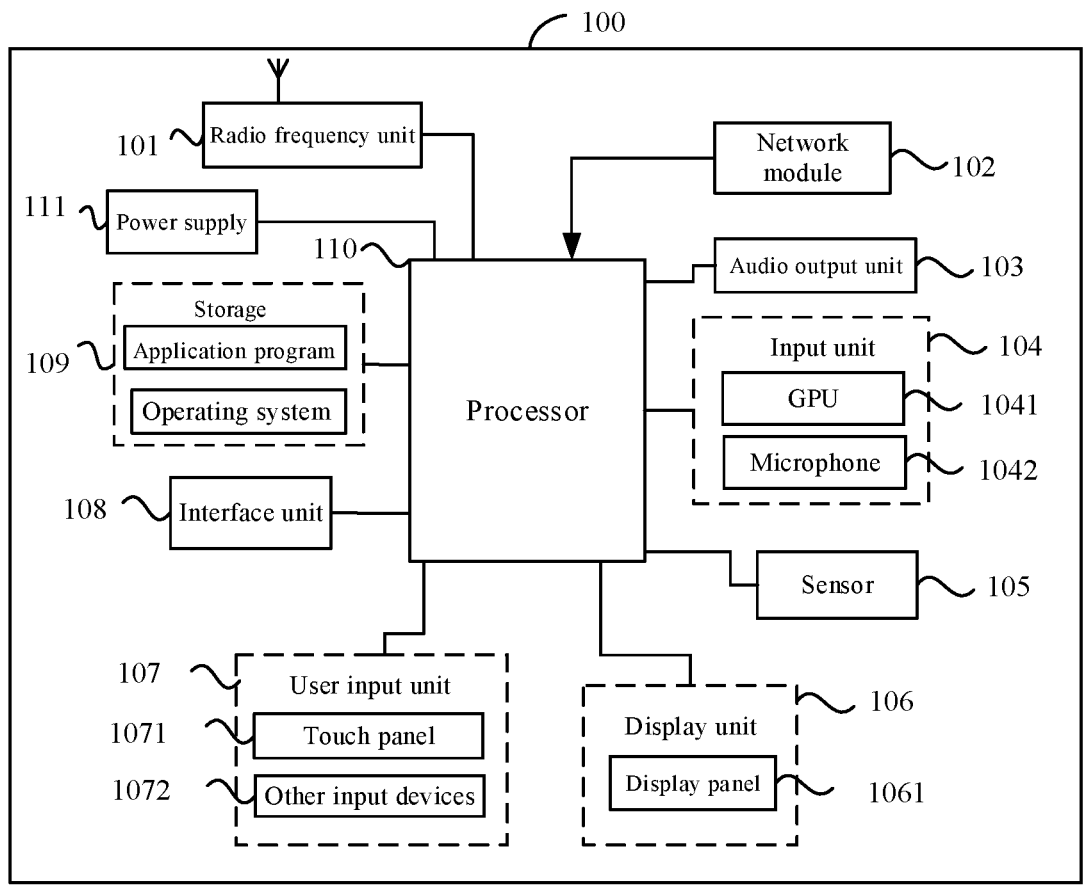
FIG. 10 is a second schematic structural diagram of a terminal provided in an embodiment of the present invention.

FIG. 10 is a schematic diagram of a hardware structure of a terminal that implements various embodiments of the present invention. A terminal 100 includes, but is not limited to, a radio frequency unit 101, a network module 102, and an audio output unit 103, an input unit 104, a sensor 105, a display unit 106, a user input unit 107, an interface unit 108, a storage 109, a processor 110, and a power supply 111 and other components. Those skilled in the art may understand that a structure of the terminal 100 shown in FIG. 10 does not constitute a limitation on the terminal, and the terminal 100 may include more or fewer components than those shown in the figure, or some combined components, or different arrangements of components. In an embodiment of the present invention, the terminal 100 includes, but is not limited to, a mobile phone, a tablet computer, a notebook computer, a palmtop computer, a car terminal, a wearable device, a pedometer, and the like.

The processor 110 monitors a PDCCH according to PDCCH blind detection capability information of the N scheduling cells; wherein, the N scheduling cells are cells from M cells configured for the terminal by a network device, the M cells further include X scheduled cells; the PDCCH blind detection capability information of the N scheduling cells is related to a cell parameter of the M cells; the PDCCH blind detection capability information of the N scheduling cells is used to indicate maximum processing capability of the terminal 100 to perform PDCCH blind detection in each scheduling cell or the N scheduling cells per unit time; M and N are positive integers greater than or equal to 1, X is a positive integer greater than or equal to 0, M=N+X.

For the terminal provided in the embodiment of the present invention, during cross-carrier scheduling process, the network device configures a cell parameter of M cells including N scheduling cells and X scheduled cells for the terminal, the terminal determines the maximum processing capability of the terminal in performing PDCCH blind detection in each scheduling cell or N scheduling cells (i.e., PDCCH blind detection capability information of the N scheduling cells) based on the cell parameter, which makes full use of processing capability of the terminal and improves energy efficiency of the terminal in monitoring a PDCCH.

It should be understood that, in some embodiments of the present invention, the radio frequency unit 101 may be used to receive and send information or send and receive signals during a call. Specifically, downlink data from a base station is received and processed by the processor 110; in addition, uplink data is sent to the base station. Generally, the radio frequency unit 101 includes, but is not limited to, an antenna, at least one amplifier, a transceiver, a coupler, a low-noise amplifier, a duplexer, and the like. In addition, the radio frequency unit 101 may also communicate with a network and other devices through a wireless communication system.

The terminal 100 provides users with wireless broadband Internet access through the network module 102, such as helping users to send and receive emails, to browse web pages, and to access streaming media, etc.

The audio output unit 103 may convert audio data received by the radio frequency unit 101 or the network module 102 or stored in the storage 109 into audio signals and output them as sound. Moreover, the audio output unit 103 may also provide audio output (for example, a call signal reception sound, a message reception sound, etc.) related to a specific function performed by the terminal 100. The audio output unit 103 includes a speaker, a buzzer, a receiver, and the like.

The input unit 104 is used to receive audio signals or video signals. The input unit 104 may include a graphics processing unit (Graphics Processing Unit, GPU) 1041 and a microphone 1042, and the graphics processing unit 1041 processes image data of a still picture or video obtained by an image capture device (such as a camera) in a video capture mode or an image capture mode. The processed image frames may be displayed on the display unit 106. The image frames processed by the graphics processing unit 1041 may be stored in the storage 109 (or other storage medium) or transmitted via the radio frequency unit 101 or the network module 102. The microphone 1042 may receive sound, and may process such sound into audio data. The processed audio data may be converted into a format output that may be transmitted to a mobile communication base station via the radio frequency unit 101 in the case of a telephone call mode.

The terminal 100 further includes at least one sensor 105, such as a light sensor, a motion sensor, and other sensors. Specifically, the light sensor includes an ambient light sensor and a proximity sensor, wherein the ambient light sensor may adjust brightness of a display panel 1061 according to brightness of the ambient light, and the proximity sensor may turn off the display panel 1061 and/or backlight in a case that the terminal 100 is moved close to an ear. As a type of the motion sensor, an accelerometer sensor may detect a magnitude of acceleration in various directions (usually three axes), and detect a magnitude and direction of gravity in the case of stationary, and be used to identify attitude of the terminal (such as horizontal-vertical screen switching, related games, magnetometer attitude calibration), vibration recognition related functions (such as pedometer, tap), etc.; the sensor 105 may also include a fingerprint sensor, a pressure sensor, an iris sensor, a molecular sensor, a gyroscope, a barometer, a hygrometer, a thermometer, an infrared sensor and the like, which are not repeated here.

The display unit 106 may be configured to display information inputted by the user or information provided to the user. The display unit 106 may include the display panel 1061, and the display panel 1061 may be configured as a form of a liquid crystal display (Liquid Crystal Display, LCD), an organic light-emitting diode (Organic Light-Emitting Diode, OLED) or the like.

The user input unit 107 may be used to receive inputted numeric information or character information and generate a signal input related to user's settings and related to a function control of the terminal 100. Specifically, the user input unit 107 includes a touch panel 1071 and other input devices 1072. The touch panel 1071, also referred to as a touch screen, may collect user's touch operations thereon or nearby (such as a user's operation on the touch panel 1071 or near the touch panel 1071 using any suitable object or accessory such as a finger or a stylus). The touch panel 1071 may include two parts, namely a touch detection device and a touch controller. The touch detection device detects the touch orientation of the user, and detects a signal generated by the touch operation, and transmits the signal to the touch controller; the touch controller receives touch information from the touch detection device, converts the touch information into a coordinate of a touch point, transmits the coordinate to the processor 110, and may receive and execute a command from the processor 110. In addition, the touch panel 1071 can be implemented in various types such as a resistive type, a capacitive type, an infrared type, and a surface acoustic wave type, etc. In addition to the touch panel 1071, the user input unit 107 may further include other input devices 1072. Specifically, the other input devices 1072 may include, but are not limited to, a physical keyboard, a function button (such as a volume control button, a switch button, etc.), a trackball, a mouse, and a joystick, and details thereof are not described herein again.

Further, the touch panel 1071 may cover the display panel 1061; in a case that the touch panel 1071 detects a touch operation thereon or nearby, the touch operation is transmitted to the processor 110 to determine the type of the touch event, then the processor 110 provides a corresponding visual output on the display screen 1061 based on the type of the touch event. Although in FIG. 10, the touch panel 1071 and the display panel 1061 are implemented as two independent components to implement input and output functions of the terminal 100, in some embodiments, the touch panel 1071 and the display panel 1061 may be integrated to implement the input and output functions of the terminal 100, which are not limited here.

The interface unit 108 is an interface through which an external device is connected to the terminal 100. For example, the external device may include a wired or wireless headset port, an external power supply (or battery charger) port, a wired or wireless data port, a storage card port, a port for connecting a device with an identification module, and an audio input/output (I/O) port, a video I/O port, or a headphone port, etc. The interface unit 108 may be used to receive input (e.g., data information, power, etc.) from the external device and transmit the received input to one or more elements within the terminal 100 or may be used to transmit data between the terminal 100 and the external device.

The storage 109 may be used to store software programs and various data. The storage 109 may mainly include a storage program area and a storage data area, wherein the storage program area may store an operating system, an application program (such as a sound playback function, an image playback function, etc.) required for at least one function, and the like; the storage data area may store data (such as audio data, a phone book, etc.) created based on the use of a mobile phone and the like. In addition, the storage 109 may include a high-speed random access storage, and may further include a non-volatile storage, such as at least one magnetic disk storage device, a flash memory device, or other volatile solid-state storage device.

The processor 110 is a control center of the terminal, and uses various interfaces and lines to connect various parts of the entire terminal 100. By running or executing software programs and/or modules stored in the storage 109 and calling data stored in the storage 109, various functions of the terminal 100 and processing data are performed, so that the overall monitoring of the terminal 100 is performed. The processor 110 may include one or more processing units; optionally, the processor 110 may integrate an application processor and a modem processor, wherein the application processor mainly processes an operating system, a user interface, and an application program, etc. The modem processor mainly handles wireless communication. It could be understood that the modem processor may not be integrated into the processor 110.

The terminal 100 may further include a power supply 111 (such as a battery) for supplying power to various components. Optionally, the power supply 111 may be logically connected to the processor 110 through a power management system, so as to implement functions such as management of charging, management of discharging, and power consumption management through the power management system.

In addition, the terminal 100 includes some functional modules that are not shown, and details are not described herein again.

Embodiment 10

Figure 11:
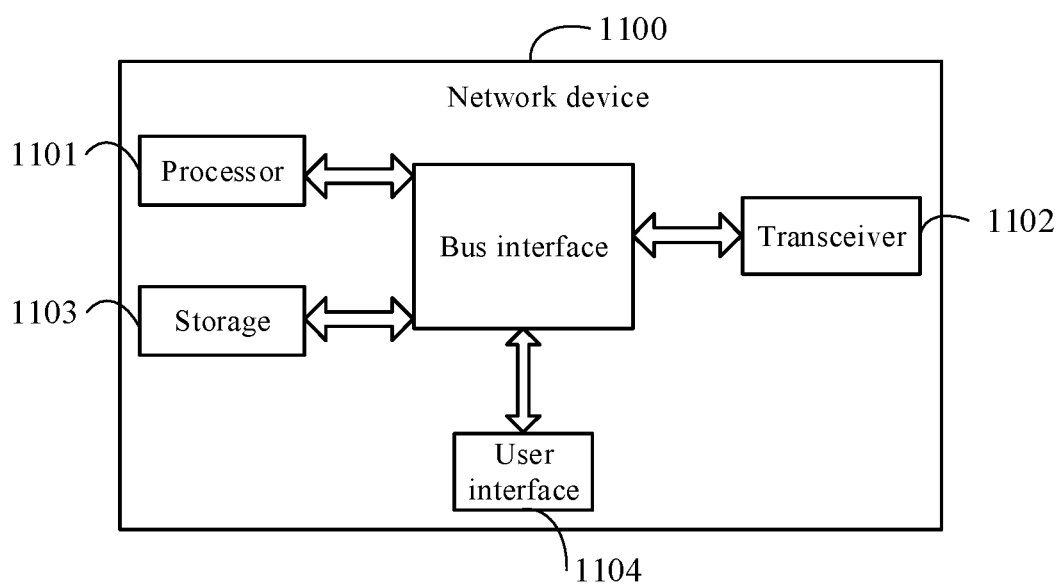
FIG. 11 is a second schematic structural diagram of a network device provided in an embodiment of the present invention.

FIG. 11 is a schematic diagram of a hardware structure of a network device that implements an embodiment of the present invention. A network device 1100 includes: a processor 1101, a transceiver 1102, a storage 1103, a user interface 1104 and a bus interface.

The transceiver 1102 is used to configure a cell parameter of M cells for a terminal; wherein the M cells include: N scheduling cells and X scheduled cells; the cell parameter is related to PDCCH blind detection capability information of the N scheduling cells; the PDCCH blind detection capability information of the N scheduling cells is used to indicate maximum processing capability of the terminal in performing PDCCH blind detection in each scheduling cell or the N scheduling cells per unit time; the cell parameter is used to indicate that the terminal monitors a PDCCH according to the PDCCH blind detection capability information of the N scheduling cells. The transceiver 1102 is further used to send a PDCCH through the N scheduling cells.

During cross-carrier scheduling process, the network device provided in the embodiment of the present invention configures a cell parameter of M cells including N scheduling cells and X scheduled cells for the terminal, so that the terminal may determine the maximum processing capability of the terminal in performing PDCCH blind detection in each scheduling cell or N scheduling cells (i.e., PDCCH blind detection capability information of the N scheduling cells) based on the cell parameter, which makes full use of processing capability of the terminal and improves energy efficiency of the terminal in monitoring a PDCCH.

In an embodiment of the present invention, in FIG. 11, a bus architecture may include any number of interconnected buses and bridges. Various circuits, specifically, one or more processors represented by the processor 1101 and a storage represented by the storage 1103, are linked together. The bus architecture may also link various other circuits such as peripherals, voltage regulators and power management circuits, which are well known in the art, and therefore a further description is omitted herein. The bus interface provides interfaces. The transceiver 1102 may be a plurality of elements, that is, includes a transmitter and a receiver, to provide units configured to communicate with various other devices over a transmission medium. For different user devices, the user interface 1104 can also be an interface capable of externally/internally connecting the required devices which including but not limited to a keypad, a display, a speaker, a microphone, a joystick, and the like. The processor 1101 is responsible for managing the bus architecture and general processing, and the storage 1103 can store data used by the processor 1101 when performing operations.

In addition, the network device 1100 further includes some functional modules that are not shown, and details are not described herein again.

Embodiment 11

Optionally, an embodiment of the present invention further provides a terminal, and the terminal includes: a processor, a storage, and a computer program stored on the storage and executable by the processor. When the computer program is executed by the processor, processes of the methods of monitoring the PDCCH in Embodiment 1 to Embodiment 6 are implemented, and the same technical effect may be achieved, which will not be repeated herein to avoid repetition.

Optionally, an embodiment of the present invention further provides a network device, and the network device includes: a processor, a storage, and a computer program stored on the storage and executable by the processor. When the computer program is executed by the processor, processes of the methods of monitoring the PDCCH in Embodiment 1 to Embodiment 6 are implemented, and the same technical effect may be achieved, which will not be repeated herein to avoid repetition.

An embodiment of the present invention also provides a computer readable storage medium, a computer program is stored on the computer readable storage medium, and when the computer program is executed by a processor, various processes of the method of monitoring the PDCCH provided in embodiments are implemented, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

It should be noted that, in this article, the terms "including" or "having" or any other variations thereof are intended to encompass a non-exclusive inclusion, such that a process, method, article, or device that includes a plurality of elements includes not only those elements but also other elements not explicitly listed, or elements that are inherent to such a process, method, article, or device. An element after a phrase "comprising a . . . " does not exclude presence of additional identical elements in the process, method, article, or device that comprises the element, without further limitation.

Through description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present invention essentially or a part thereof contributing to the prior art may be embodied in the form of a computer software product which may be stored in a storage medium (e.g., a ROM/RAM, a magnetic disk or an optical disk) and which includes several instructions to cause a terminal (which may be a mobile phone, a computer, a server, an air-conditioner or a network device, etc.) to perform the methods described in the various embodiment of the present invention.

The embodiments of the present invention are described above with reference to the accompanying drawings, but the present invention is not limited to the above-mentioned specific embodiments, and the above-mentioned specific embodiments are only illustrative and not restrictive. A person of ordinary skill in the art with hints of the present invention may also make many forms that fall within the protection scope of the present invention without departing from the spirit and the protection scope of the claims of the present invention.

What is claimed is:

1. A method of monitoring a Physical Downlink Control Channel (PDCCH), wherein, the method is performed by a terminal and comprises:
    monitoring a PDCCH according to PDCCH blind detection capability information of N scheduling cells;
    wherein, the N scheduling cells are cells from M cells configured for the terminal by a network device, the M cells further comprise X scheduled cells; the PDCCH blind detection capability information of the N scheduling cells is related to a cell parameter of the M cells; the PDCCH blind detection capability information of the N scheduling cells is used to indicate maximum processing capability of the terminal in performing PDCCH blind detection in each scheduling cell or the N scheduling cells per unit time;
    M and N are positive integers greater than or equal to 1, X is a positive integer greater than or equal to 0, M=N+X;
    wherein the cell parameter comprises at least one of: the number of cells capable of being scheduled by each scheduling cell, a subcarrier spacing of each cell, a cell identity of each cell, and the number M of cells configured for the terminal; the method further comprises:
    acquiring first candidate PDCCH blind detection capability information and second candidate PDCCH blind detection capability information of a first scheduling cell, and determining a minimum between the first candidate PDCCH blind detection capability information and the second candidate PDCCH blind detection capability information as PDCCH blind detection capability information of the first scheduling cell, in a case that subcarrier spacings of the M cells are same;
    wherein, the first candidate PDCCH blind detection capability information is related to at least one of: a first value, first information, and second information corresponding to a subcarrier spacing of the first scheduling cell; the second candidate PDCCH blind detection capability information is related to at least one of: the number of cells capable of being scheduled by the first scheduling cell and the second information;
    the first information is used to indicate maximum processing capability supported by the terminal in performing PDCCH blind detection; the second information is used to indicate maximum processing capability of the terminal in performing PDCCH blind detection in a single cell under a configuration of a subcarrier spacing corresponding to the first scheduling cell; the first value is an allocation ratio of PDCCH blind detection capability allocated by the terminal for the first scheduling cell; the first scheduling cell is one of the N scheduling cells.

2. A non-transitory computer readable storage medium, wherein, a computer program is stored on the computer readable storage medium, and when the computer program is executed by a processor, the processor implements steps of the method of monitoring the Physical Downlink Control Channel (PDCCH) according to claim 1.

3. The non-transitory computer readable storage medium according to claim 2, wherein, the first value is a ratio between the number of cells capable of being scheduled by the first scheduling cell and the number M of cells configured for the terminal.

4. The non-transitory computer readable storage medium according to claim 2, wherein, when the computer program is executed by a processor, the processor further implements:
    acquiring fifth information; wherein, the fifth information is used to indicate the number of PDCCHs monitored by the terminal in all search space sets of the N scheduling cells;
    not allocating part of search space sets of a third scheduling cell, or allocating part of PDCCH blind detection capability to part of search space sets of a third scheduling cell, in a case that it is determined based on the fifth information that the number of PDCCHs monitored by the terminal in all search space sets of the N scheduling cells exceeds maximum processing capability supported by the terminal in performing PDCCH blind detection;
    wherein, the third scheduling cell is one of the N scheduling cells, and the third scheduling cell corresponds to at least one scheduled cell.

5. The method according to claim 1, wherein, the first value is a ratio between the number of cells capable of being scheduled by the first scheduling cell and the number M of cells configured for the terminal.

6. The method according to claim 1, wherein, the method further comprises:
    acquiring fifth information; wherein, the fifth information is used to indicate the number of PDCCHs monitored by the terminal in all search space sets of the N scheduling cells;
    not allocating part of search space sets of a third scheduling cell, or allocating part of PDCCH blind detection capability to part of search space sets of a third scheduling cell, in a case that it is determined based on the fifth information that the number of PDCCHs monitored by the terminal in all search space sets of the N scheduling cells exceeds maximum processing capability supported by the terminal in performing PDCCH blind detection;
    wherein, the third scheduling cell is one of the N scheduling cells, and the third scheduling cell corresponds to at least one scheduled cell.

7. A terminal, comprising a processor, a storage, and a computer program stored on the storage and executable by the processor, wherein in a case that the computer program is executed by the processor, the processor implements a method of monitoring a Physical Downlink Control Channel (PDCCH), the method comprises following steps:
    monitoring a PDCCH according to PDCCH blind detection capability information of N scheduling cells;

wherein, the N scheduling cells are cells from M cells configured for the terminal by a network device, the M cells further comprise X scheduled cells; the PDCCH blind detection capability information of the N scheduling cells is related to a cell parameter of the M cells; the PDCCH blind detection capability information of the N scheduling cells is used to indicate maximum processing capability of the terminal in performing PDCCH blind detection in each scheduling cell or the N scheduling cells per unit time;

M and N are positive integers greater than or equal to 1, X is a positive integer greater than or equal to 0, M=N+X, wherein the cell parameter comprises at least one of: the number of cells capable of being scheduled by each scheduling cell, a subcarrier spacing of each cell, a cell identity of each cell, and the number M of cells configured for the terminal, and in a case that the computer program is executed by the processor, the processor further implements:

acquiring first candidate PDCCH blind detection capability information and second candidate PDCCH blind detection capability information of a first scheduling cell, and determining a minimum between the first candidate PDCCH blind detection capability information and the second candidate PDCCH blind detection capability information as PDCCH blind detection capability information of the first scheduling cell, in a case that subcarrier spacings of the M cells are same;

wherein, the first candidate PDCCH blind detection capability information is related to at least one of: a first value, first information, and second information corresponding to a subcarrier spacing of the first scheduling cell; the second candidate PDCCH blind detection capability information is related to at least one of: the number of cells capable of being scheduled by the first scheduling cell and the second information;

the first information is used to indicate maximum processing capability supported by the terminal in performing PDCCH blind detection; the second information is used to indicate maximum processing capability of the terminal in performing PDCCH blind detection in a single cell under a configuration of a subcarrier spacing corresponding to the first scheduling cell; the first value is an allocation ratio of PDCCH blind detection capability allocated by the terminal for the first scheduling cell; the first scheduling cell is one of the N scheduling cells.

8. The terminal according to claim 7, wherein, in a case that the computer program is executed by the processor, the processor further implements:

acquiring fifth information; wherein, the fifth information is used to indicate the number of PDCCHs monitored by the terminal in all search space sets of the N scheduling cells;

not allocating part of search space sets of a third scheduling cell, or allocating part of PDCCH blind detection capability to part of search space sets of a third scheduling cell, in a case that it is determined based on the fifth information that the number of PDCCHs monitored by the terminal in all search space sets of the N scheduling cells exceeds maximum processing capability supported by the terminal in performing PDCCH blind detection;

wherein, the third scheduling cell is one of the N scheduling cells, and the third scheduling cell corresponds to at least one scheduled cell.

9. The terminal according to claim 7, wherein, the first value is a ratio between the number of cells capable of being scheduled by the first scheduling cell and the number M of cells configured for the terminal.

10. A network device, comprising a processor, a storage, and a computer program stored on the storage and executable by the processor, wherein in a case that the computer program is executed by the processor, the processor implements a method of monitoring a Physical Downlink Control Channel (PDCCH), the method comprises:

configuring a cell parameter of M cells for a terminal; wherein the M cells comprise N scheduling cells and X scheduled cells; the cell parameter is related to PDCCH blind detection capability information of the N scheduling cells; the PDCCH blind detection capability information of the N scheduling cells is used to indicate maximum processing capability of the terminal in performing PDCCH blind detection in each scheduling cell or the N scheduling cells per unit time; the cell parameter is used to indicate that the terminal monitors a PDCCH according to the PDCCH blind detection capability information of the N scheduling cells;

sending a PDCCH through the N scheduling cell, wherein the cell parameter comprises at least one of: the number of cells capable of being scheduled by each scheduling cell, a subcarrier spacing of each cell, a cell identity of each cell, and the number M of cells configured for the terminal; the method further comprises:

acquiring first candidate PDCCH blind detection capability information and second candidate PDCCH blind detection capability information of a first scheduling cell, and determining a minimum between the first candidate PDCCH blind detection capability information and the second candidate PDCCH blind detection capability information as PDCCH blind detection capability information of the first scheduling cell, in a case that subcarrier spacings of the M cells are same;

wherein, the first candidate PDCCH blind detection capability information is related to at least one of: a first value, first information, and second information corresponding to a subcarrier spacing of the first scheduling cell; the second candidate PDCCH blind detection capability information is related to at least one of: the number of cells capable of being scheduled by the first scheduling cell and the second information;

the first information is used to indicate maximum processing capability supported by the terminal in performing PDCCH blind detection; the second information is used to indicate maximum processing capability of the terminal in performing PDCCH blind detection in a single cell under a configuration of a subcarrier spacing corresponding to the first scheduling cell; the first value is an allocation ratio of PDCCH blind detection capability allocated by the terminal for the first scheduling cell; the first scheduling cell is one of the N scheduling cells.

11. The network device according to claim 10, wherein, the first value is a ratio between the number of cells capable of being scheduled by the first scheduling cell and the number M of cells configured for the terminal.

12. The network device according to claim 10, wherein, the method further comprises:

acquiring fifth information; wherein, the fifth information is used to indicate the number of PDCCHs monitored by the terminal in all search space sets of the N scheduling cells;

not allocating part of search space sets of a third scheduling cell, or allocating part of PDCCH blind detection capability to part of search space sets of a third scheduling cell, in a case that it is determined based on the fifth information that the number of PDCCHs monitored by the terminal in all search space sets of the N scheduling cells exceeds maximum processing capability supported by the terminal in performing PDCCH blind detection;

wherein, the third scheduling cell is one of the N scheduling cells, and the third scheduling cell corresponds to at least one scheduled cell.

\* \* \* \* \*